United States Patent [19]
Kishibuchi et al.

[11] Patent Number: 6,110,061
[45] Date of Patent: Aug. 29, 2000

[54] DEVICE FOR TRANSMITTING ROTATIONAL POWER

[75] Inventors: Akira Kishibuchi, Nagoya; Manabu Saiki, Chiryu; Toshitada Nagasawa, Kariya; Toshiki Taya, Nagoya, all of Japan

[73] Assignee: Denso Corporation, Kariya, Japan

[21] Appl. No.: 09/030,508

[22] Filed: Feb. 25, 1998

[30] Foreign Application Priority Data

| Feb. 26, 1997 | [JP] | Japan | 9-042634 |
| May 27, 1997 | [JP] | Japan | 9-136869 |

[51] Int. Cl.[7] ............... F16H 59/00; F16D 7/02
[52] U.S. Cl. ............... 474/17; 464/89; 464/30
[58] Field of Search .............. 474/17, 21, 20; 464/30, 89, 180, 162; 403/359, 225; 74/493, 411, 432, 443

[56] References Cited

U.S. PATENT DOCUMENTS

| 2,164,485 | 7/1939 | Yantis . |
| 2,396,498 | 3/1946 | Fitch . |
| 4,043,437 | 8/1977 | Taylor . |
| 4,667,530 | 5/1987 | Mettler et al. ............... 74/493 |
| 5,195,625 | 3/1993 | Chang . |
| 5,219,273 | 6/1993 | Chang . |
| 5,390,774 | 2/1995 | Thurston . |
| 5,452,622 | 9/1995 | Fenelon ............... 74/411 |
| 5,460,574 | 10/1995 | Hobaugh ............... 464/89 X |
| 5,683,299 | 11/1997 | Kishibuchi . |
| 5,899,811 | 5/1999 | Kishibuchi et al. ............... 464/30 |

FOREIGN PATENT DOCUMENTS

| 0 702 167 | 3/1996 | European Pat. Off. . |
| 965 155 | 9/1950 | France . |
| 43 44 151 | 6/1995 | Germany . |
| 8-135686 | 5/1956 | Japan . |
| 6-109031 | 4/1994 | Japan . |
| 8-135752 | 5/1996 | Japan . |
| 801 998 | 8/1958 | United Kingdom . |

*Primary Examiner*—David A. Bucci
*Assistant Examiner*—Marcus Charles
*Attorney, Agent, or Firm*—Pillsbury Madison & Sutro LLP

[57] ABSTRACT

A device for transmitting rotational power from a rotational power source to a driven device having a drive shaft includes at least one elastic connecting member defining outer and inner peripheral surfaces. First and second holder members radially cooperate with each other to circumferentially hold the at least one elastic connecting member during normal operation to transmit the rotation, and are disconnected by the deformation of the at least one elastic connecting member when the torque on the drive shaft exceeds a predetermined cutoff torque level. A weakened portion is provided at least one of the first and second holder members. The weakened portion aids the deformation of at least one of the first and second holder members to reduce a torsional spring coefficient which is defined by the ratio of the relative rotational angle between the first and second holder member to the torque on the drive shaft.

15 Claims, 20 Drawing Sheets

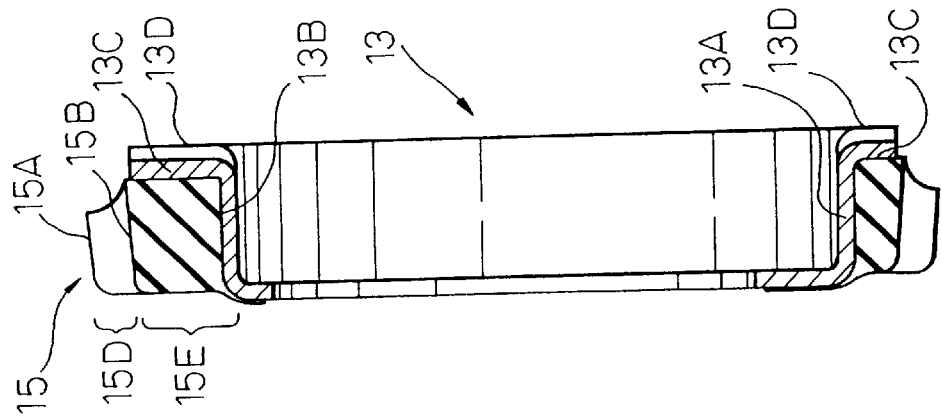
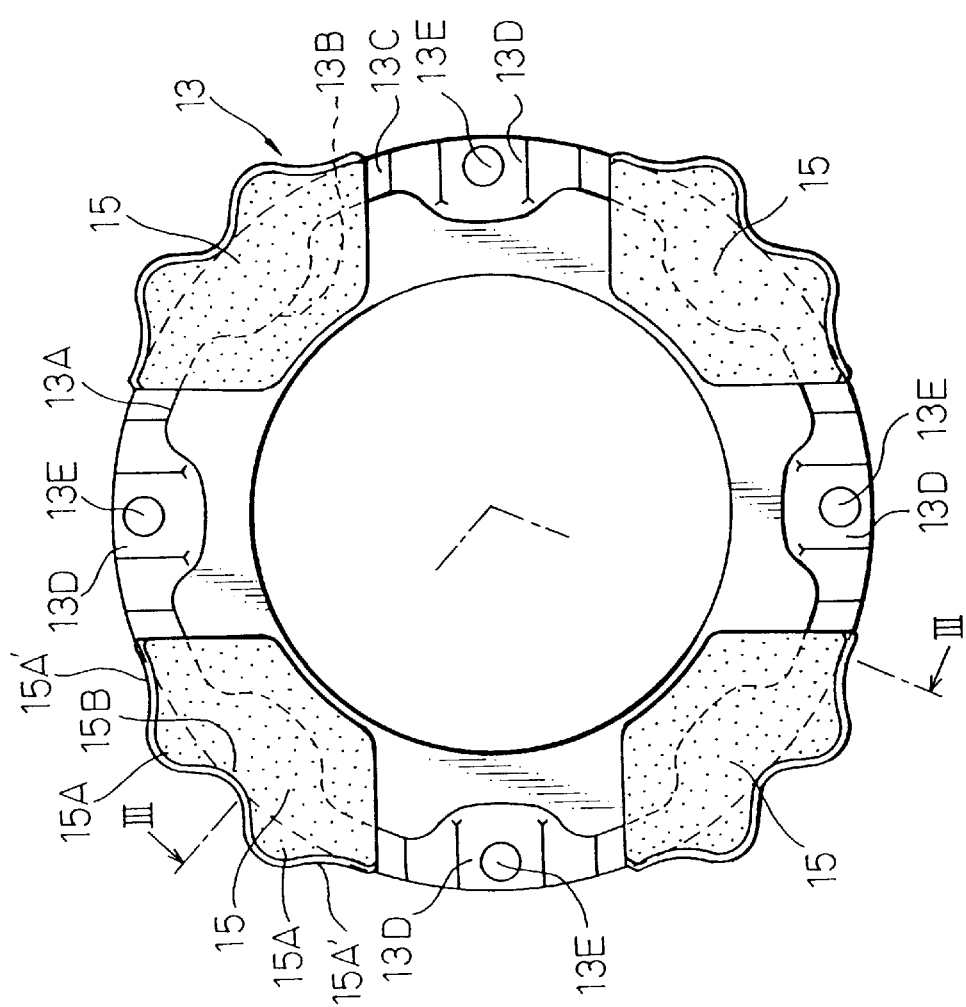

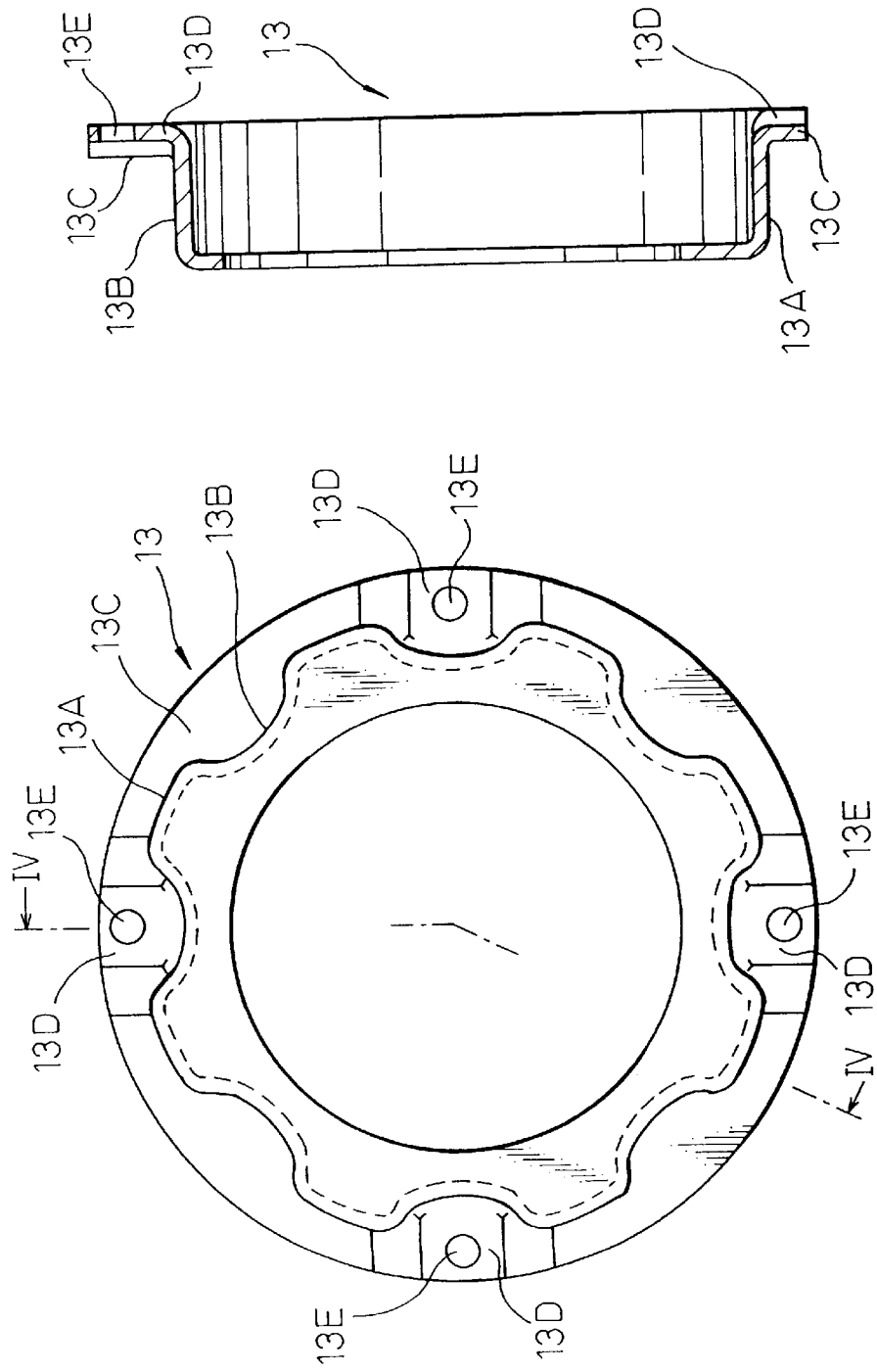

DEVICE FOR TRANSMITTING ROTATIONAL POWER

CROSS-REFERENCE TO RELATED APPLICATION

Reference is made to commonly assigned application Ser. No. 08/807,393, having an issued U.S. Pat. No. 5,899,811 entitled "A DEVICE FOR TRANSMITTING ROTATIONAL POWER", filed on Feb. 27, 1997.

BACKGROUND OF THE INVENTION

1. Field of the Invention

The invention relates to a device for transmitting rotational power from a rotational power source such as an automobile engine to a rotational driven device such as a refrigerant compressor for an air conditioner. The device can rotationally separate the driven device from the rotational power source when the torque transmitted exceeds a predetermined cutoff torque level, that is, the device functions as a torque limiter.

2. Description of the Related Art

Japanese Unexamined Patent Publication (Kokai) No. 8-135752 describes a rotational power transmission device which can limit the maximum torque transmission and absorb a fluctuation in the torque. The device transmits rotational power from a rotational power source, such as an automobile engine, to a driven device, such as a compressor used in an automobile air conditioning system. The device comprises an elastic connecting member defining radially outer and inner peripheral surfaces. First and second holder members are provided to radially cooperate with each other to circumferentially hold the elastic connecting member during normal operation to transmit the rotation, and are disconnected by the deformation of the elastic connecting member when the torque on the drive shaft exceeds a predetermined cutoff torque level, for example when the drive shaft of the compressor is locked by a failure such as seizing in the compressor and the torque on the device exceeds a predetermined cutoff torque level.

In the prior art rotational power transmission device, however, the elastic connecting members cannot deform sufficiently to disengage at the predetermined cutoff torque level when the temperature of the elastic connecting member is low. Thus, the device of the prior art has a problem that it cannot disconnect the rotational power transmission when the temperature of the connecting member is low during a winter season.

SUMMARY OF THE INVENTION

The invention is directed to solve the above mentioned prior art problems, and the objective of the invention is to provide a rotational power transmission device improved to disconnect the rotational power transmission at a predetermined cutoff torque level if the temperature of the elastic connecting member is low.

Further, the objective of the invention is to provide a rotational power transmission device in which the durability of the elastic connecting member is improved while preventing the cutoff torque level from being too high.

According to the invention there is provide a device for transmitting rotational power from a rotational power source to a driven device having a drive shaft. The device for transmitting rotational power comprises: at least one elastic connecting member defining outer and inner peripheral surfaces; a first holder member, for holding the at least one elastic connecting member at the radially outer or inner periphery of the at least one elastic connecting member, the first holder member being connected to the drive shaft, and a second holder member for holding the at least one elastic connecting member at the radially inner or outer periphery of the at least one elastic connecting member, the second holder member is operatively connected the rotational power source. The first and second holder members radially cooperate with each other to circumferentially hold the at least one elastic connecting member during normal operation to transmit the rotation, and is disconnected by the deformation of the at least one elastic connecting member when the torque on the drive shaft exceeds a predetermined cutoff torque level. A weakened portion is provided at least one of the first and second holder members. The weakened portion aids the deformation of at least one of the first and second holder members to reduce a torsional spring coefficient which is defined by the ratio of the relative rotational angle between the first and second holder member to the torque on the drive shaft.

According to the invention, the disengagement of the elastic connecting member from one of the first and second holder members disconnect the torque transmission when the torque on the drive shaft exceeds a predetermined cutoff torque level. The elastic connecting member absorb a fluctuation in the torque. Further, the weakened portion aids the deformation of at least one of the first and second holder members to cutoff the torque transmission at the predetermined cutoff torque level if the temperature of the connecting member is low so that the deformation of the connecting member decreases.

DESCRIPTION OF THE DRAWINGS

These and other objects and advantages and further description will now be discussed in connection with the drawings in which:

FIG. 3A is a front view of the holder member with connecting members adhered to the holder member according to the embodiment of FIG. 1;

FIG. 3B is a section of the holder member and the connecting members along line III—III in FIG. 3A;

FIG. 4A is a front view of the holder member according to the embodiment of FIG. 1;

FIG. 4B is a section of the holder member along line IV—IV in FIG. 4A;

DESCRIPTION OF THE PREFERRED EMBODIMENTS

Figure 1:
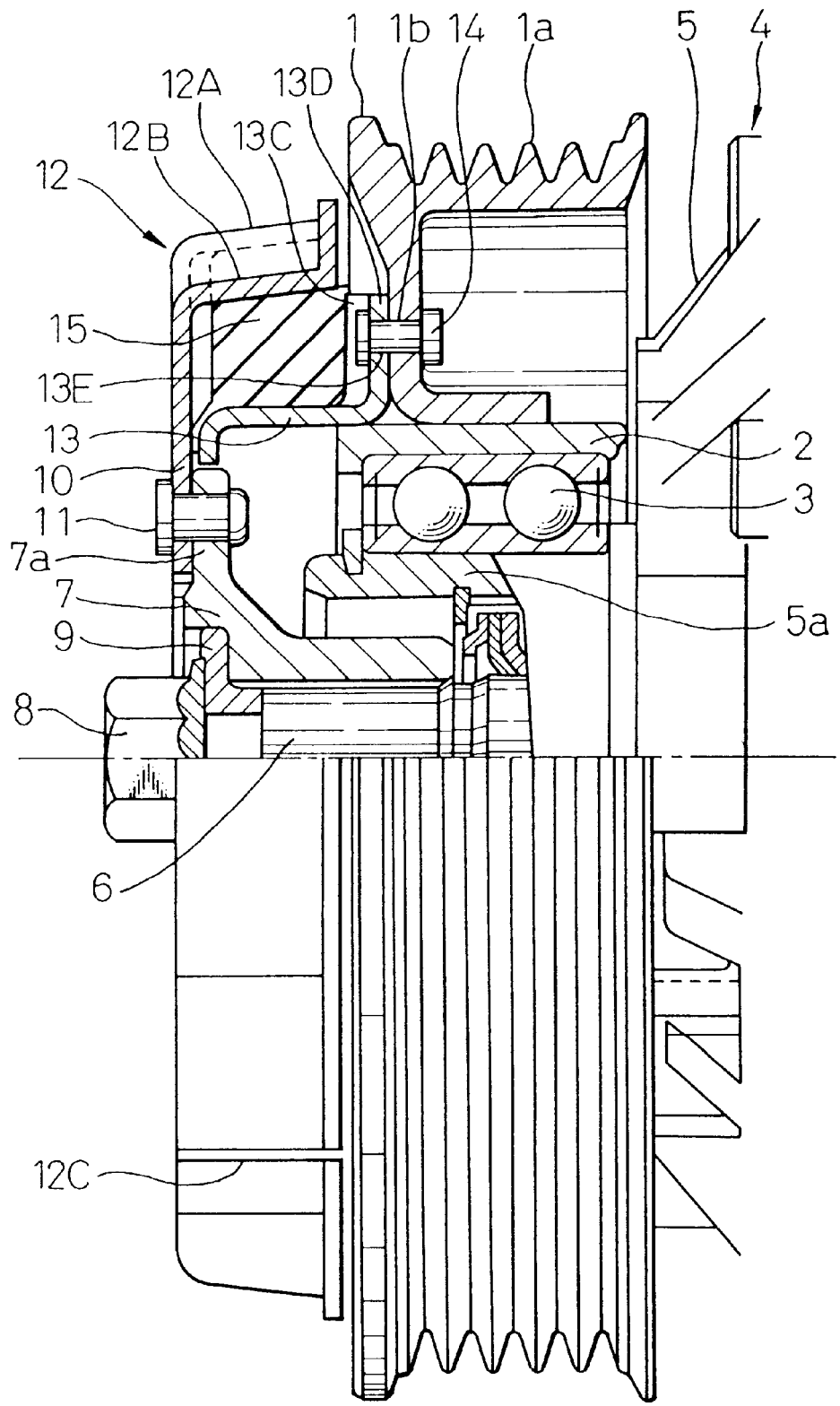
FIG. 1 is a partial section of the device for transmitting rotational power according to the first embodiment of the invention in which the device is mounted to a drive shaft of a compressor for use in an automobile air conditioning system.
Figure 2:
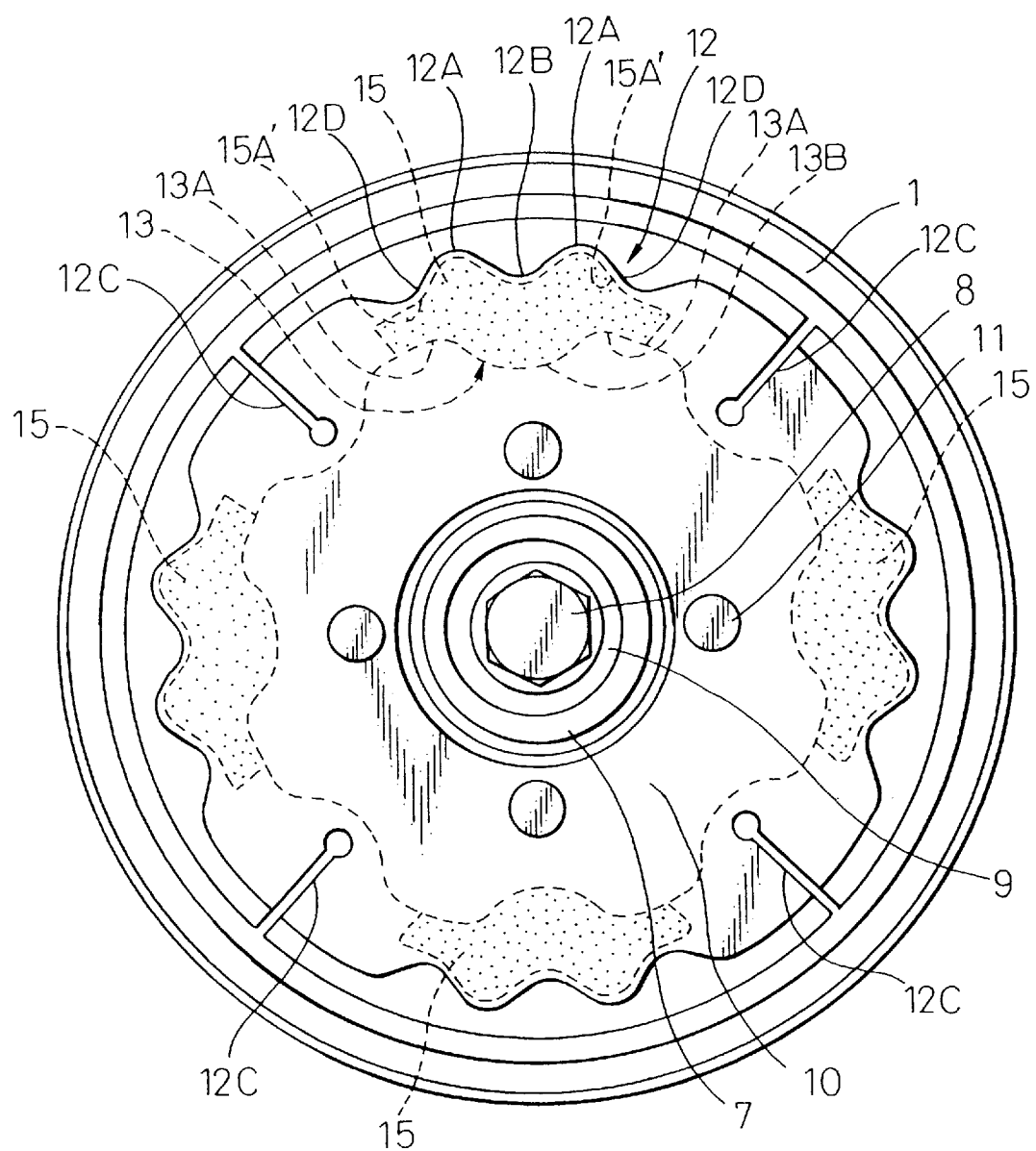
FIG. 2 is a front view of the device of FIG. 1 in which the elastic connecting member is indicated by dots to show clearly.

With reference to FIGS. 1 and 2, a rotational power transmission device according to the first embodiment of the invention comprises a pulley 1 for receiving rotational driving power from an automobile engine (not shown) as a rotational power source. The pulley 1 includes a rim 1a with a plurality of V-shaped grooves adapted to engage V-shaped belts 21 (FIG. 5), and is operationally connected to a crank shaft (FIG. 5) of the automobile engine through V-shaped belts 21.

Figure 5:
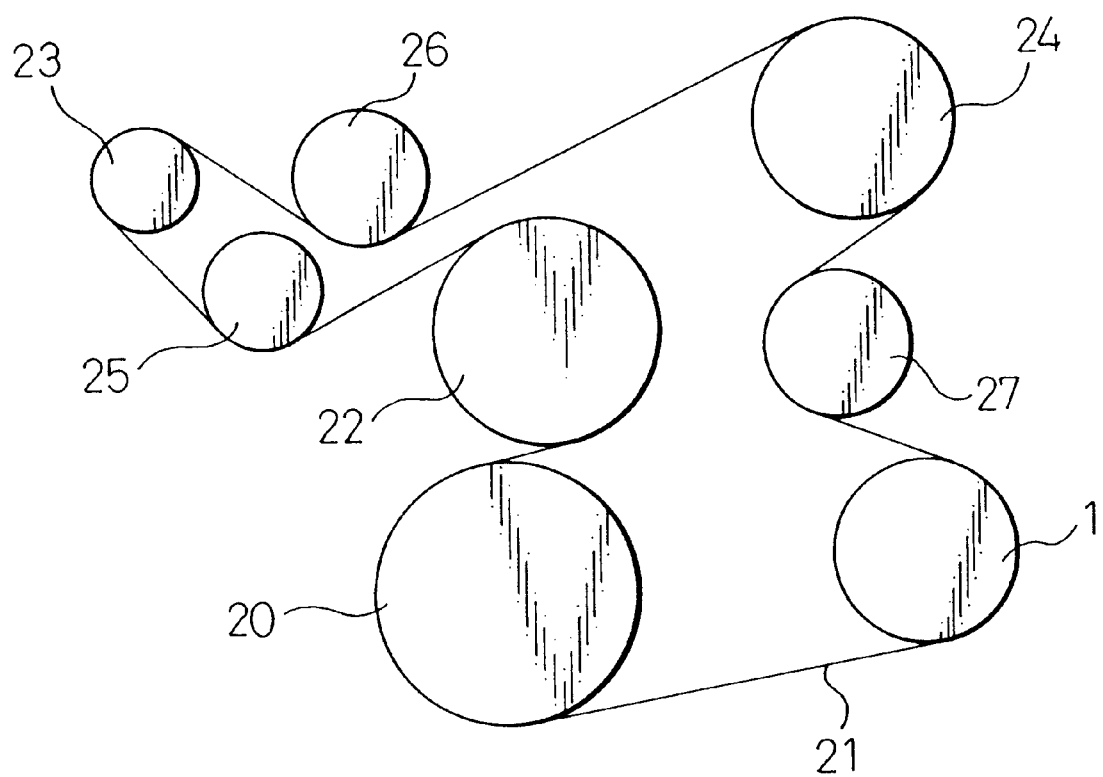
FIG. 5 illustrates a system diagram of devices on an automobile engine to which the device of the invention is applied.

FIG. 5 illustrates an example of a drive system for devices on the automobile engine. The system includes a crank pulley 20 which is connected to the crank shaft of the automobile engine. The belts 21 extend from the crank pulley 20 via water pump pulley 22 of a water pump in a cooling system of the automobile engine, an alternator pulley 23 of an alternator for charging a battery, a hydraulic pump pulley 24 of a hydraulic pump for a power steering system, and the pulley 1. Tension pulleys or idle pulleys 25, 26 and 27 are provided for applying a tension to the belts 21.

Referring to FIGS. 1 and 2 again, the pulley 1 is connected to a rotor 2 by an appropriate connecting method such as welding. The rotor 2 is mounted on a cylindrical support 5a, which outwardly extends from a front housing 5 of a compressor 4 as a driven device, by a bearing 3 for rotation. The compressor 4 is of a variable displacement type for use in an automobile air conditioning system (not shown). The compressor 4 comprises a front housing 5a and a rear housing (not shown) connected to each other to form a cylinder block including a plurality of parallel cylinder bores disposed about the axis. A drive shaft 6 extends through the cylinder block along the axis. Connected to the drive shaft 6 through a swash plate (not shown) are reciprocating pistons (not shown) to be provided within the cylinder bores. Changing the angle of the swash plate continuously changes the displacement of the compressor 4 within a range of 0–100%. Using a variable displacement type compressor avoids the necessity of an electromagnetic clutch for an on/off operation of the compressor.

A detailed description regarding the compressor 4 and the automobile air conditioning system is disclosed in U.S. Pat. No. 5,683,299, which is incorporated herein by reference, thus no further description is made to avoid redundancy.

The rotational power transmission device further comprises a first hub 7 with a flange portion, an end plate 9 and a bolt 8 thready connected to the end of the drive shaft 6. In particular, the first hub 7 is connected to the drive shaft 6 through a spline connection to prevent the relative rotation therebetween.

Connected to the first hub 7 by rivets 11 is a second hub 10 which is formed into a ring plate with a cylindrical wall 12 extending along the outer periphery of the second hub 10. The second hub and the cylindrical wall 12 provides a first holder member. The wall 12 includes a plurality of pairs of radially outwardly convex portions 12A arranged along the periphery of the second hub 10 (refer to FIG. 2) and concave portions 12B between the respective pairs of convex portions 12A. Further, a pair of foot portions 12D are defined on the pair of the convex portions 12A opposite to the concaves portion 12B. The convex and concave portions 12A and 12B and the foot portions 12D provide an engagement force in the peripheral direction as described hereinafter.

A holder member 13, which provides a second holder member, substantially in the form of a ring, is provided to hold a plurality of elastic connecting members 15 by cooperation with the cylindrical wall 12 of the second hub 10. The elastic connecting members 15 are adhered to the holder member 13.

According to this embodiment, four elastic connecting members 15 are shown in FIG. 3A as an example. The holder member 13, as shown in FIGS. 3A and 3B, also includes a plurality of outwardly convex and concave portions 13A and 13B alternatively arranged along its periphery. The holder member 13 further includes clamping portions 13C, for axially clamping the elastic connecting member 15 by cooperation with the second hub 10 and flange portions 13D.

The clamping portions 13C substantially have an L shape section which includes axial and radial portions. The axial portions of the clamping portions 13C define the convex and concave portions 13A and 13B. The flange portions 13D also substantially have an L shape section with axial and radial portions. The axial portions of the flange portions 13D extend further than those of the clamping portions 13C. The flange portions 13D include through holes 13E into which rivets 14 are fitted to secure the holder member 13 to the pulley 1.

Each of the elastic connecting members 15 includes a sector portion 15E and an engagement portion 15D (FIG. 3B). The engagement portion 15D defines a pair of outwardly convex portions 15A and a concave portion 15B between the convex portions 15A. A pair of foot portions 15A' are defined on the pair of the convex portions 15A opposite to the concave portion 15B. The foot portions 15A' of the elastic connecting members 15 engage the foot portions 12D of the wall 12.

The elastic connecting members 15 are preferably made of an elastic material, which can transfer a torque and absorb a variation in the torque, within a temperature range for use an automobile (for example, −30 to 120 degrees Celsius), such as a rubber material, preferably, chlorinated butyl rubber, acrylonitrile-butadien rubber or ethylene-propylene rubber. In FIG. 2, the elastic connecting member 15 is indicated by dots.

During assembly, the elastic connecting members 15 are clamped between the clamping portions 13C of the holder member 13 and the second hub 10 so that the elastic connecting members 15 are disposed at an angle about the axis. When assembled, the outwardly convex and concave portions of the elastic connecting members 15 are mated to those of the wall 12 and of the holder member 13 to provide the positive engagement between the hub and wall 10 and 12, elastic connecting members 15 and the holder member 13.

The radial portions of the clamping portions 13C prevent the elastic connecting members 15 from moving in the axial direction. The difference, in the axial length, between the flange portions 13D and the clamping portions 13C of the holder member 13 allows the elastic connecting members 15 to be axially separate from the outer end face of the pulley 1, which reduces the contamination on the elastic connecting members 15 due to oil from the compressor 4.

The thickness of the elastic connecting members 15 is slightly larger than the distance between the second hub 10 and the clamping portions 13C of the holder member 13. Thus, the elastic connecting members 15 are pressed therebetween, when assembled, to ensure the engagement with the second hub 10 and the holder member 13 through the convex and concave portions in addition to the adhesion of the connecting members 15 to the holder member 13. The positive engagement operatively connects the holder member 13 to the second hub 10. Thus, the rotation is transmitted from the pulley 1 to the drive shaft 6 of the compressor 4 through the holder member 13, the elastic connecting members 15, the second hub 10 and the first hub 7.

A plurality of radial slits 12C, in this embodiment four slits, are provided in the second hub 10 and the cylindrical wall 12 at an angle about the axis. In particular, the slits 12C extend from radially middle portions of the second hub 10 through the peripheral wall 12 to divide the wall into portions, in this embodiment into four portions. Further, the slits 12C are preferably disposed in the hub and wall 10 and 12 between the elastic connecting members 15 as shown in FIG. 2. This disposition of the slits 12C does not deteriorate the dimensional accuracy of the radially outwardly convex and concave portions 12A and 12B of the wall 12. The slits 12C facilitate the second hub 10 to deform. The deformation of the second hub 10 moves the cylindrical wall 12 in the axial and peripheral directions, as described hereinafter.

The operational function of the embodiment will be described.

The rotation of the crank pulley 20 (FIG. 5) of the automobile engine is transmitted to the pulley 1 through the belt 21 (FIG. 5). The second hub 10 is rotated through the positive engagement between the elastic connecting members 15 and the holder member 13 and the elastic connecting members 15 and the wall 12 of the second hub 10. Thus, the drive shaft 6 of the compressor 4 is rotated by the rotating pulley 1 through the holder member 13, the elastic connecting members 15 and the wall 12 of the second hub 10.

During the normal operation of the compressor 4, a torque, in general 20 Nm, about the drive shaft 6 is applied to the elastic connecting members 15. For the normal torque of about 20 Nm, the elastic connecting members 15 can transmit the rotational power while the elastic connecting members 15 deform to absorb a fluctuation in the torque. Thus, the noise due to the torque fluctuation is reduced.

The elastic connecting members 15 deforms to disengage from the wall 12 of the second hub 10 when the toque about the drive shaft 6 exceeds a predetermined cutoff torque level, which is referred to a cutoff torque level, for example 70 Nm due to a failure of the compressor. During the deformation and disconnection of the elastic connecting members 15, the pulley 1, however, continues to rotate, which results in the rotation of the elastic connecting members 5 and in reengagement of the members. When the failure is slight and the drive shaft 6 is locked temporarily, the engaged elastic connecting members 15 can transmit the rotation to the drive shaft 6. Thus, the compressor 4 can operate again automatically. When a significant failure occurs in the compressor 4 and the drive shaft 6 is permanently locked, the wear and tear on the elastic connecting members 15 completely separates the drive shaft 6 from the pulley 1. Thus, the failure on belts 21 or the other devices 22, 23 and 24 for the automobile engine is prevented.

Figure 6A:
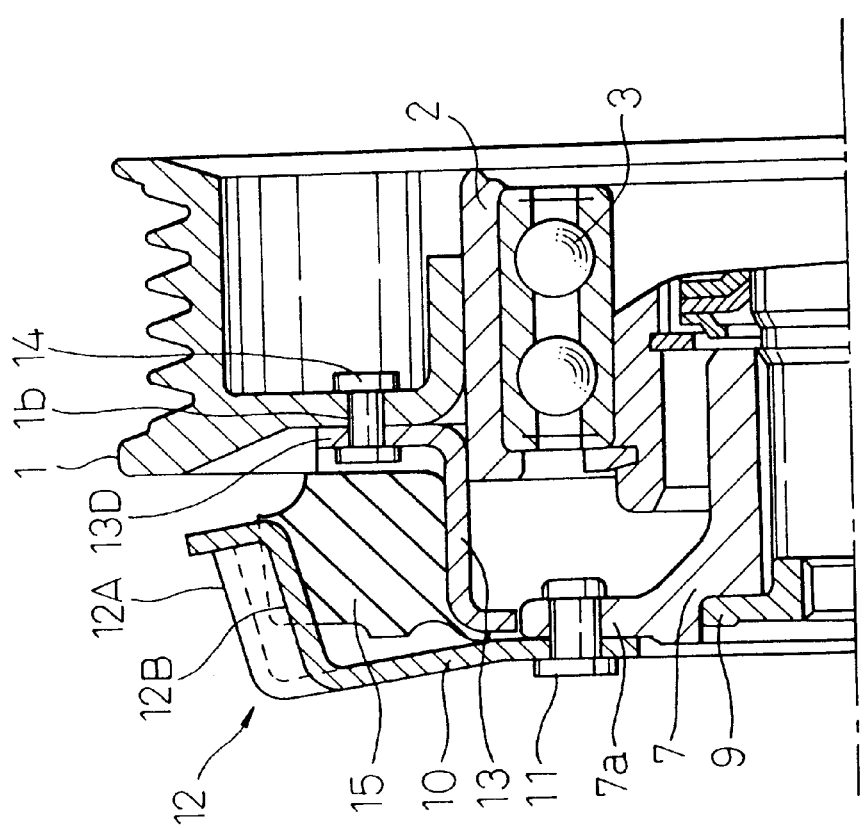
FIG. 6A is a partial section of the device for transmitting rotational power similar to FIG. 1 in which the device is not deformed.
Figure 6B:
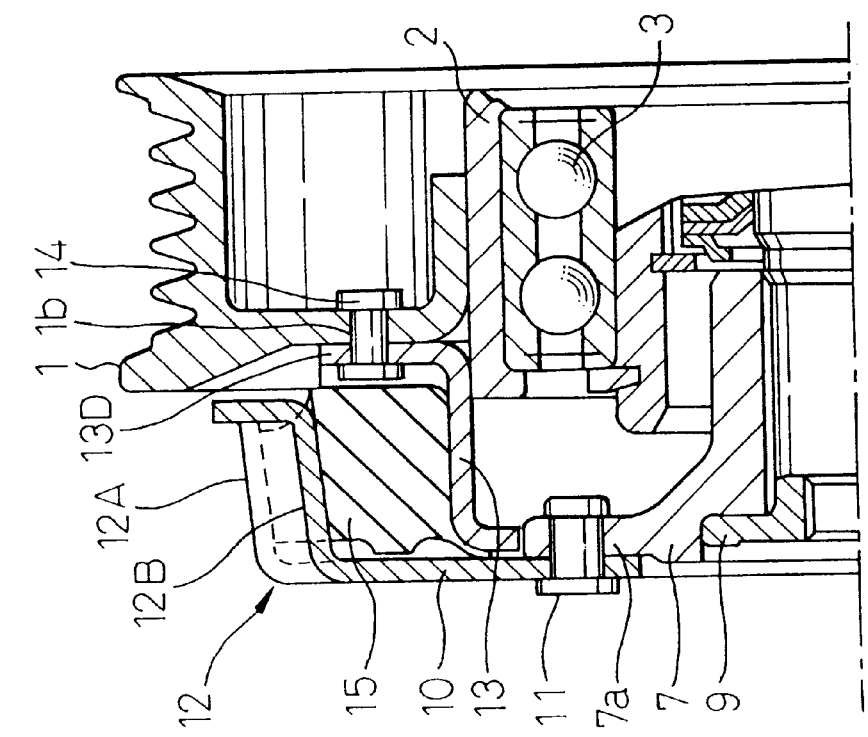
FIG. 6B is a section similar to FIG. 6A but the device is deformed to release the connecting members.
Figure 7:
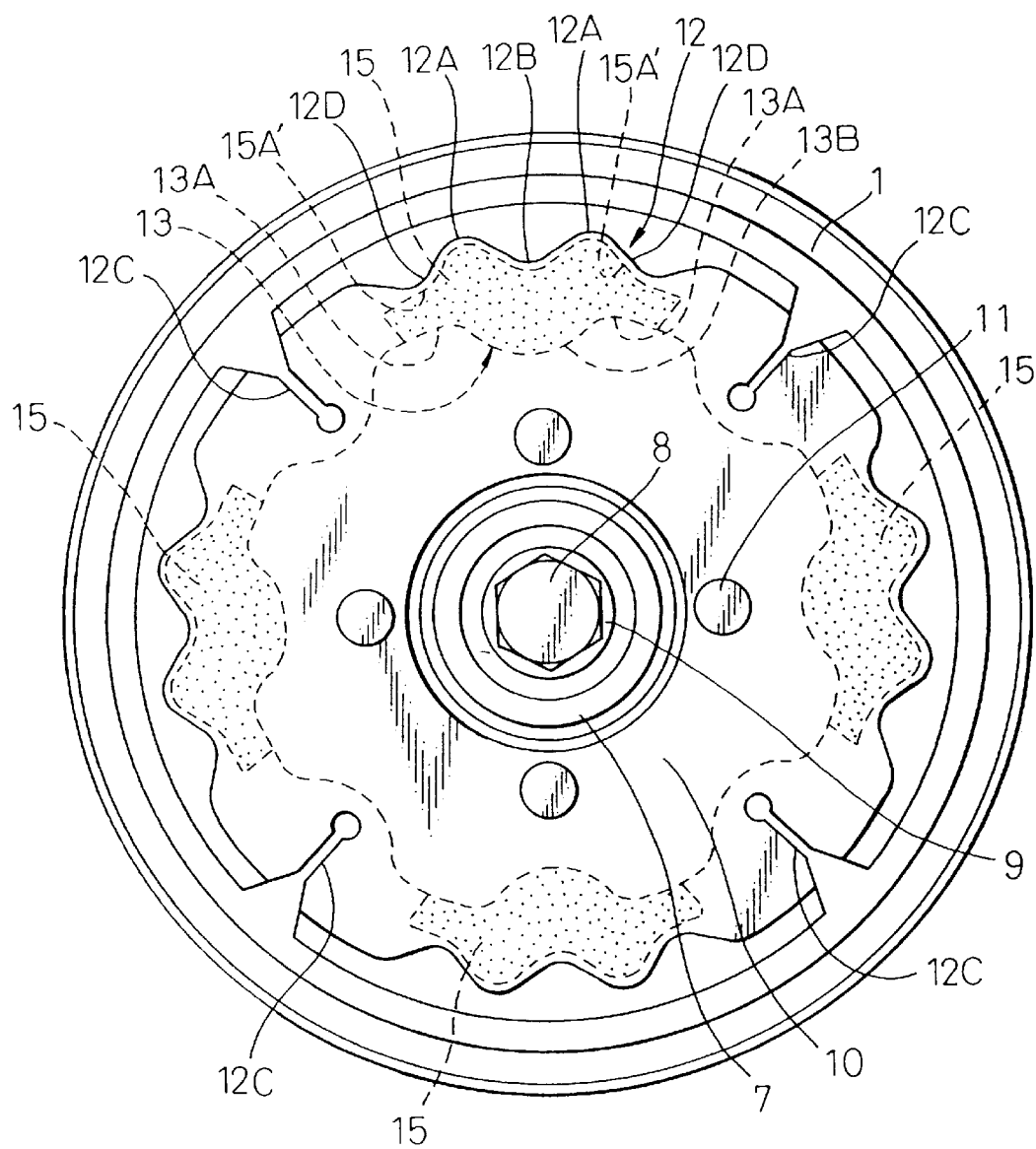
FIG. 7 is a front view of the device of FIG. 1 in which the device is deformed.

In a warm season from spring to autumn, the temperature of the elastic connecting members 15 is kept high enough to deform and disengage easily. On the other hand, in a winter season, the temperature of the elastic connecting members 15 can fall so that, even at the cutoff torque level, the elastic connecting members 15 do not deform sufficiently to cutoff the transmission of the rotational power if the second hub and wall 10 and 12 do not include the slits 12C. As mentioned above, the slits 12C facilitate the deformation of the second hub 10 to move the wall 12 in the axial and peripheral directions so that the cold cured elastic connecting members 15 can disengage from the wall 12. FIG. 6A is a partial section of the device in which the hub and wall 10 and 12 do not deform, and FIGS. 6B and 7 are a partial section and a front view of the device, respectively, in which the second the hub and wall 10 and 12 deform. Since the second hub and wall 10 and 12 are made of a metallic material, as mentioned above, their deformation properties do not substantially depend on the temperature around an automobile. Thus, the configuration of the embodiment enables the device to cutoff the rotational power at substantially a constant cutoff torque level, even under a very low temperature condition, for example at −20 degrees Celsius.

Figure 8:
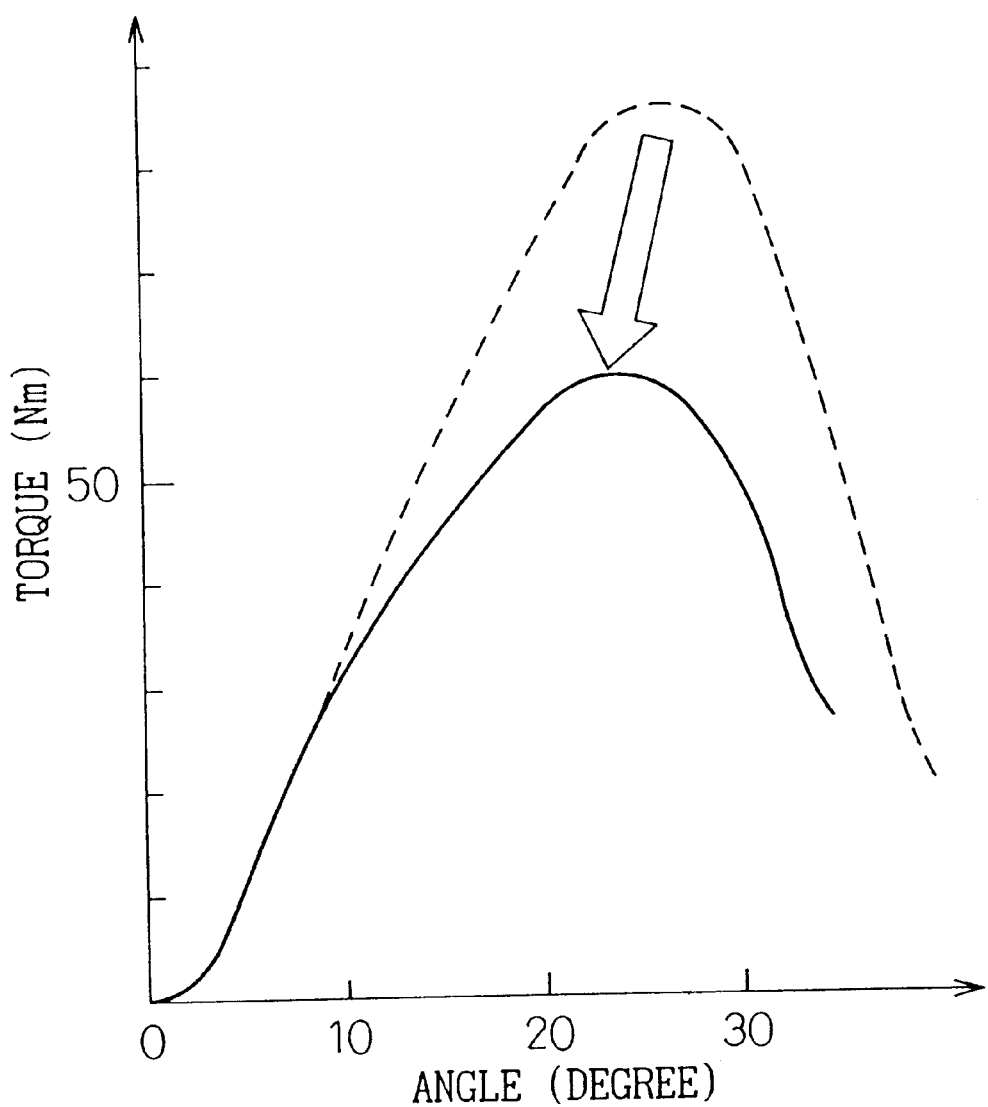
FIG. 8 illustrates an experimental result of the devices according to the first embodiment and the prior art.

FIG. 8 illustrates an experimental result of the embodiment, in which the abscissa indicates the rotational angle of the holder member 13 relative to the hub and wall 10 and 12, and the ordinate indicates the torque about the drive shaft 6. In FIG. 8, the solid curve presents the device according to the embodiment in which the second the hub and wall 10 and 12 include the slits 12C. The broken line presents a device without the slits. The experiment was carried out under the ambient temperature of 0 (zero) Celsius degree. As can be understood from FIG. 8, the slits 12C reduces the maximum torque transmission from about 85 Nm to 60 Nm.

In this specification, the ratio of the relative rotational angle between the hub 10 and the holder member 13 to the torque defines "torsional spring coefficient". According to the embodiment, within the low torque range (0–30 Nm), the torsional spring coefficient is high since the increase of the angle is small relative to the increase of the torque. On the other hand, within the high torque range (above 30 Nm), the deformation of the hub and wall 10 and 12 promotes the increase in the angle to reduce the coefficient. Thus, when the torque is relatively high, the torsional spring coefficient decrease to prevent the increase in the cutoff torque level becoming too high if the temperature is low. On the other hand, when the torque is relatively low, the coefficient increases to decrease the deformation of the resilient elastic connecting members 15 so that the durability of the members 15 is improved.

Figure 9:
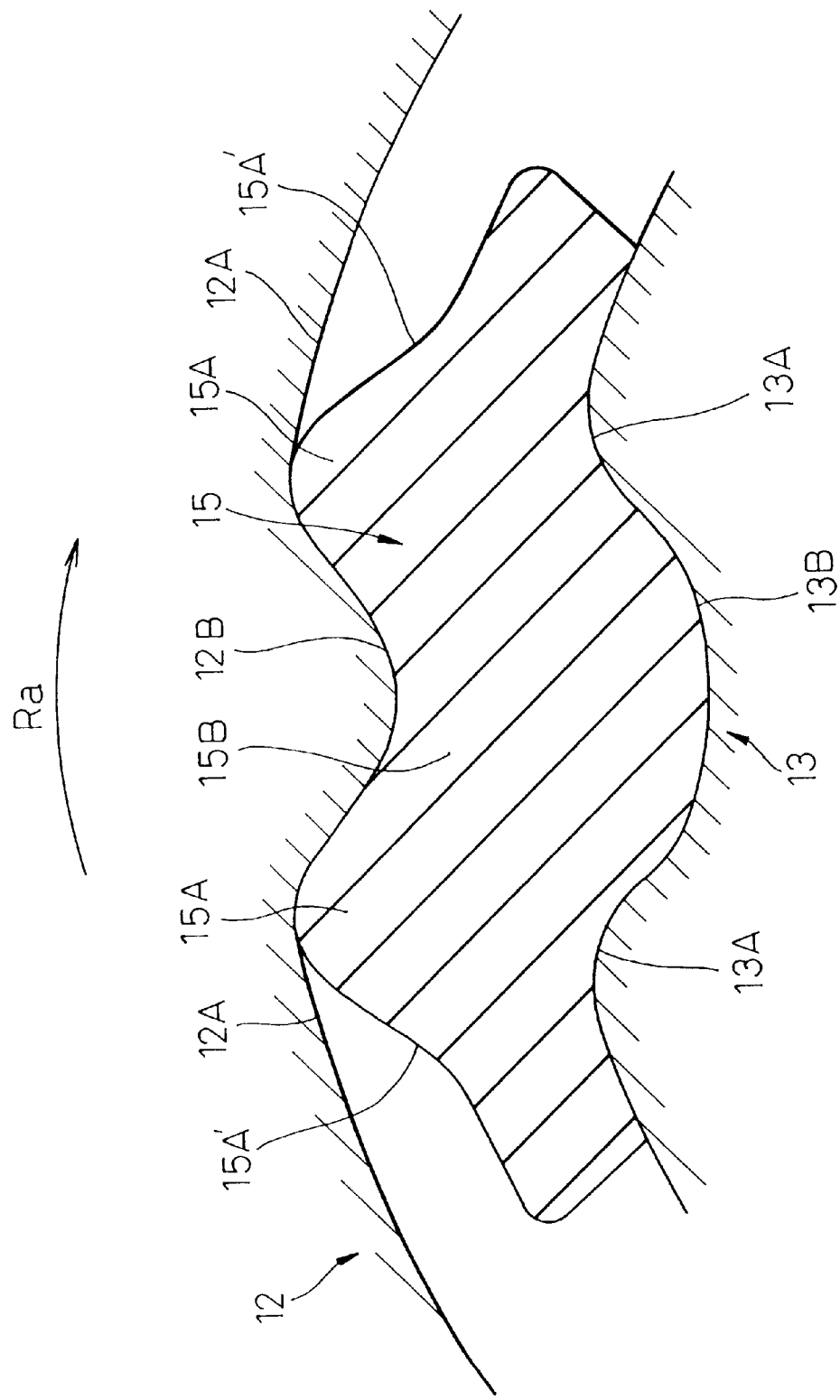
FIG. 9 is a partially enlarged view of a comparative example.

FIG. 9 shows an example for comparison in which a portion of the wall 12, one of the elastic connecting members 15 and a portion of the holder member 13 are illustrated. The wall 12 includes a pair of outwardly convex portions 12A and a single outwardly concave portion 12B between the convex portions 12A for each of the elastic connecting members 15. The concave portion 12B mates to the concave portion 15B of the elastic connecting member 15. A plurality of pairs of cavities are provided between the wall 12 and the foot portions 15A' of the elastic connecting members 15.

In FIG. 9, the rotational direction is indicated by arrow RA. The elastic connecting member 15 receives force from the wall 12 to deform opposite to the arrow RA. The deformation results in the relative rotational angle between the wall 12 and holder member 13.

On the other hand, in this embodiment of the invention, the wall 12 includes first and second radially concave portions 12B and 12D. The second concave portions 12D engage the front foot portions 15A' so that the forward cavities between the wall 12 and the elastic connecting member 15 are removed to increase the torsional spring coefficient, as shown in FIG. 11.

Figure 10:
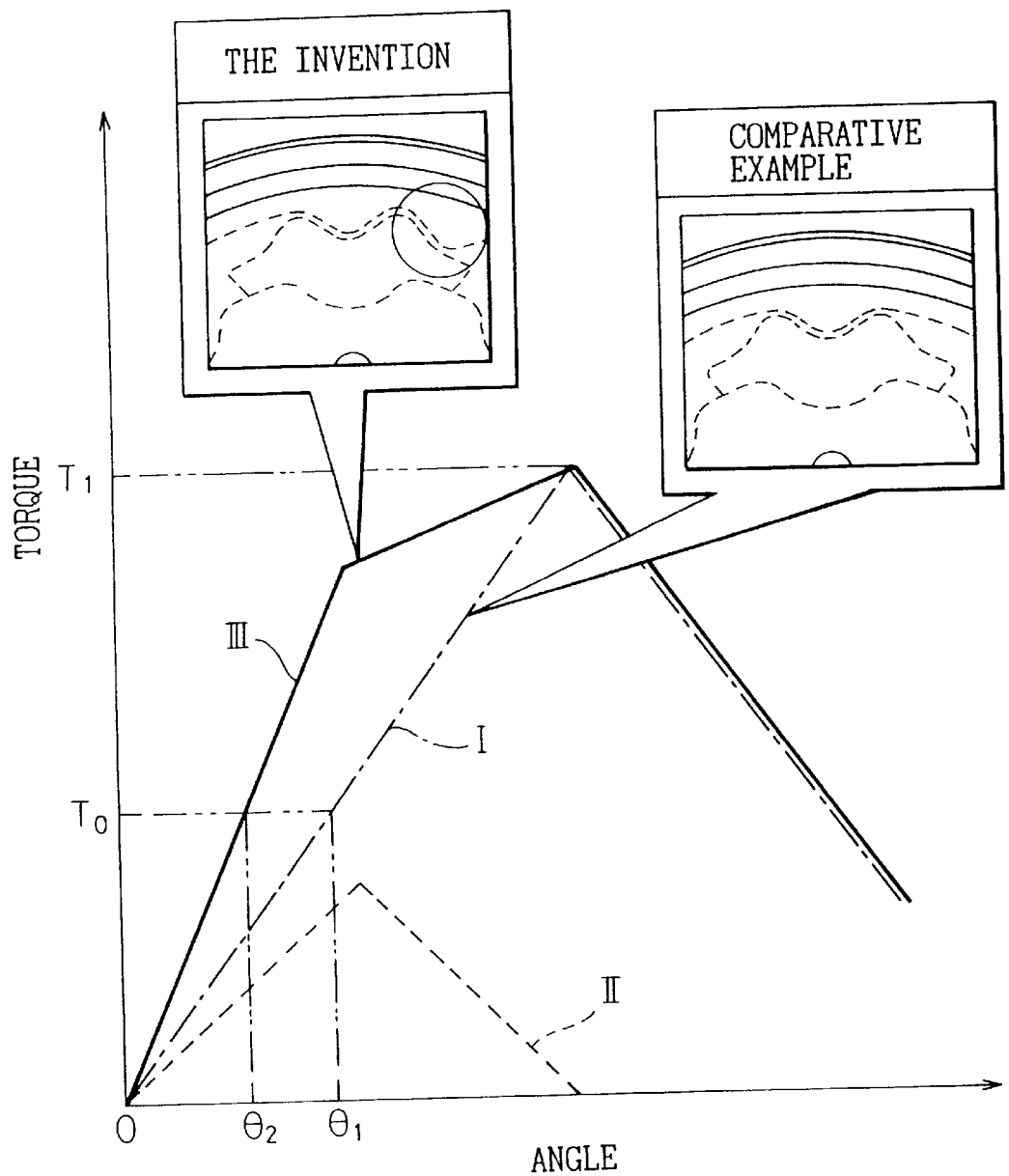
FIG. 10 illustrates the characteristics of the torsional spring coefficient of the devices according the invention and the comparative example.
Figure 11:
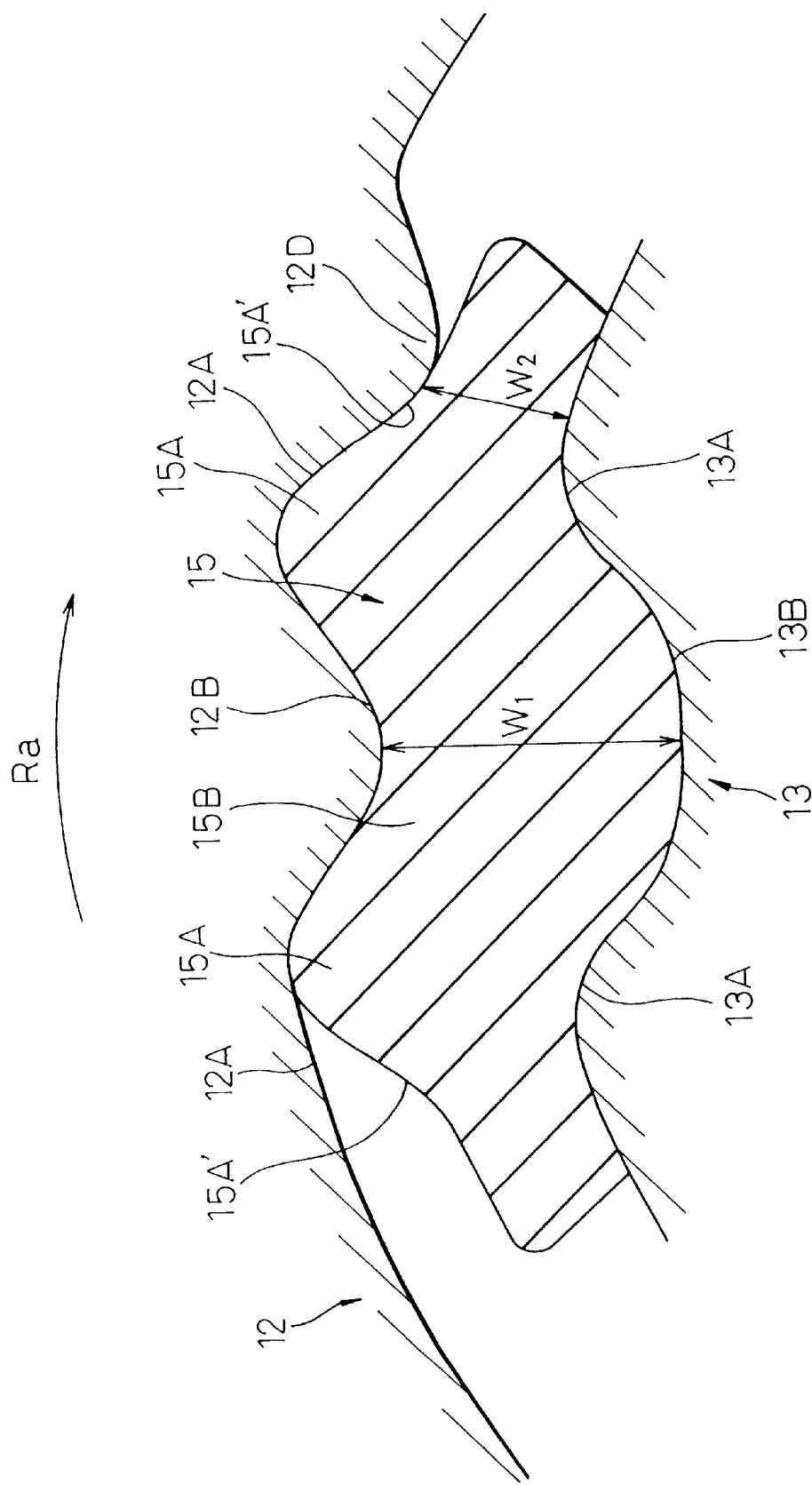
FIG. 11 is a partially enlarged view, similar to FIG. 9, of the invention.

With reference to FIG. 10, lines I and III present the characteristics of the torsional spring coefficients of the comparative example shown in FIG. 9 and the embodiment shown in FIG. 11, respectively. In FIG. 10, line II presents another example, in which the wall 12 do not include the first concave portions and include only the second concave portion which engages the forward foot portions 15A' of the elastic connecting members 15.

Regarding the radial width of the elastic connecting member, the elastic connecting member 15 has a width W1 of the concave portion 15B which is larger than a width W2 of the foot portion 15A', as shown in FIG. 11. The line II shows that the above radial dimensional feature has a characteristic that the transmitted torque reaches the maximum value at a low relative rotational angle and the torsional spring coefficient is small.

The characteristic of the inventive device shown by the line III substantially corresponds to the combination of lines I and II, and is that the torsional spring coefficient is relatively high within the low torque range, and is relatively low within the high torque range. For example, when the torque is $T_0$ in FIG. 10 which substantially corresponds to the real torque on the drive shaft 6 during the normal operation of the compressor 4, the relative rotational angle between the wall 12 and the holder member 13 is, according to the invention, $\Theta_2$ which is smaller that that of $\Theta_1$ according to the comparative example. Thus, according to the invention, the deformation of the elastic connecting member 15 is smaller compared with the example whereby the durability thereof is improved.

Further, according to the invention, the torsional spring coefficient decreases at the relatively high torque since the contribution of the engagement between the foot portions 12D of the wall 12 and the foot portion 15A' of the elastic connecting members 15 decreases as shown by the line II, which makes the cutoff torque level T1 of the invention same as the comparative example. According to the embodiment, the deformation of the elastic connecting member 15 decrease during the normal operation of the compressor 4 to improve the durability of the elastic connecting member 15 while the cutoff torque level is limited to the level T1 the same as the comparative example.

Figure 12:
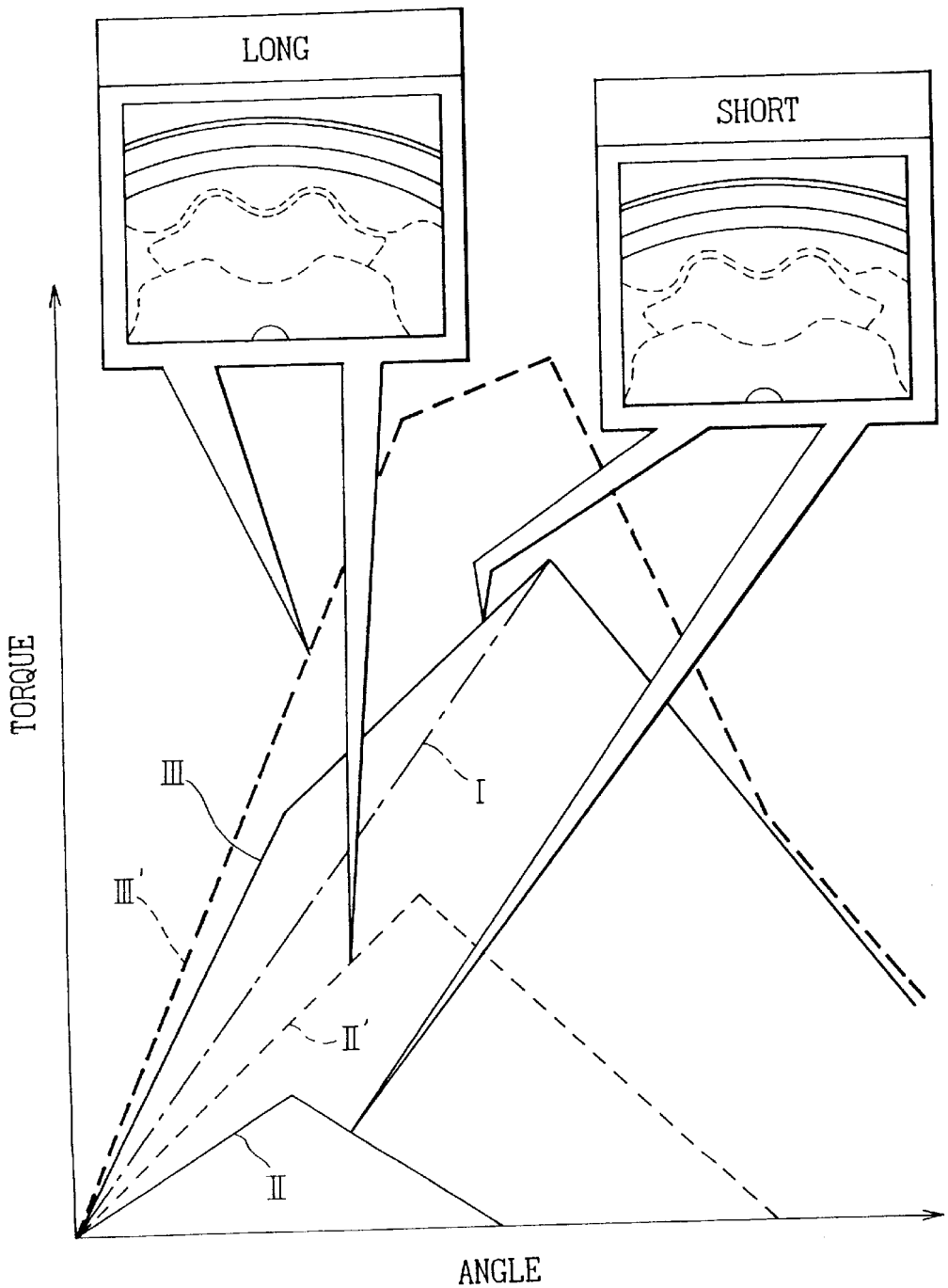
FIG. 12 illustrates the characteristics of the torsional spring coefficient of the devices according the invention and the comparative example for comparing the effect of the short and long foot portions of the connecting members and walls.

The torsional spring coefficient of the device is adjustable by changing the length of the foot portion 15A', which also changes the contribution of the engagement between the foot portion 15A' and the wall 12. With reference to FIG. 12, the effect of the length of the foot portion 15A' is illustrated. The lines I, II and III are the same as shown in FIG. 10. Examples in which longer foot portions are employed are indicated with a prime.

Incidentally, it may be understood that the wall 12 may include the front and rear foot portions 12D to engage both the front and rear foot portions 15A' of the elastic connecting member 15 as shown in FIG. 2 while, in FIG. 11, only the front foot portions 12D of the wall 12 engage the front foot portions 15A'.

The second embodiment of the invention will be described hereinafter.

Figure 13:
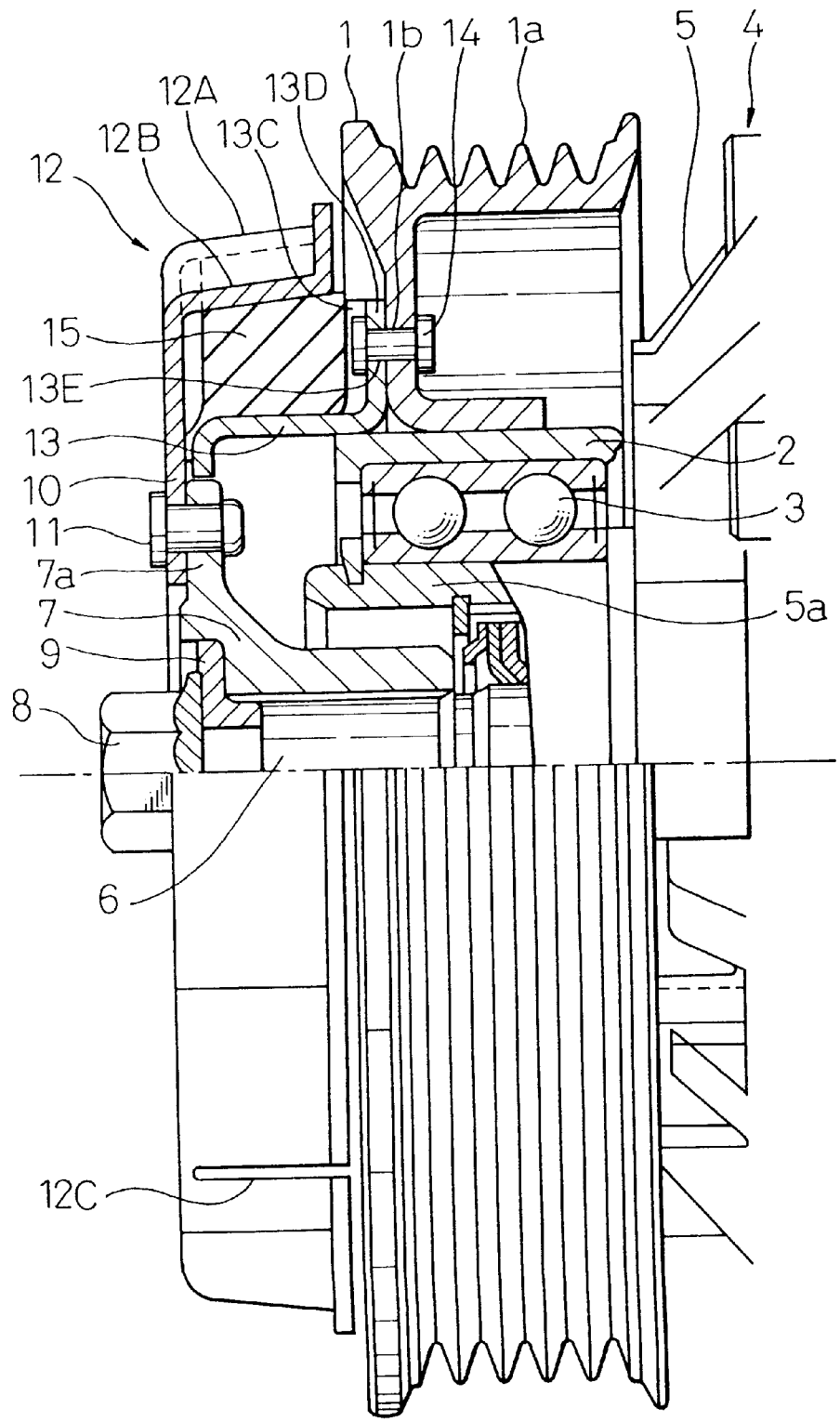
FIG. 13 is a partial section, similar to FIG. 1, of the device according to the second embodiment of the invention.
Figure 14:
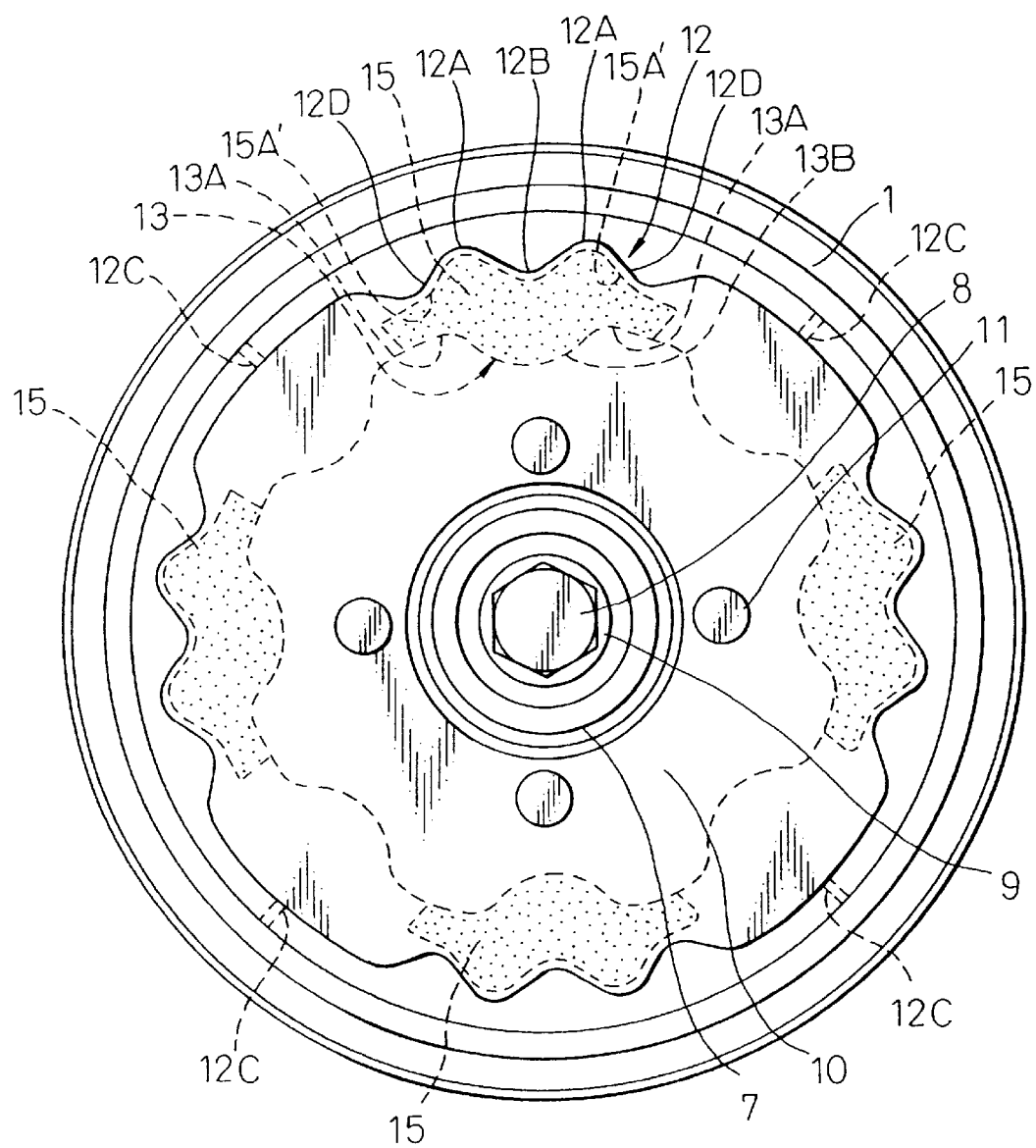
FIG. 14 is a front view, similar to FIG. 2, of the device of FIG. 13.

FIGS. 13 and 14 illustrate the second embodiment, in which the slits 12C are provided only in the wall 12 while, in the first embodiment, the slits 12C are provided in the second hub and wall 10 and 12. The other configurations are identical to those of the first embodiment.

According to the second embodiment, the length of the slits 12C is shorter than those in the first embodiment so that the deformations of the hub and wall 10 and 12 decrease compared with the first embodiment. The reduction of the deformation of the hub and wall 10 and 12 can be compensated by appropriately selecting the material and the configuration of the elastic connecting members 15, in particular the length of the foot portions 15A'. The short slits 12 reduce the plastic or permanent deformation of the hub and wall 10 and 12.

The third embodiment of the invention will be described hereinafter.

Figure 15:
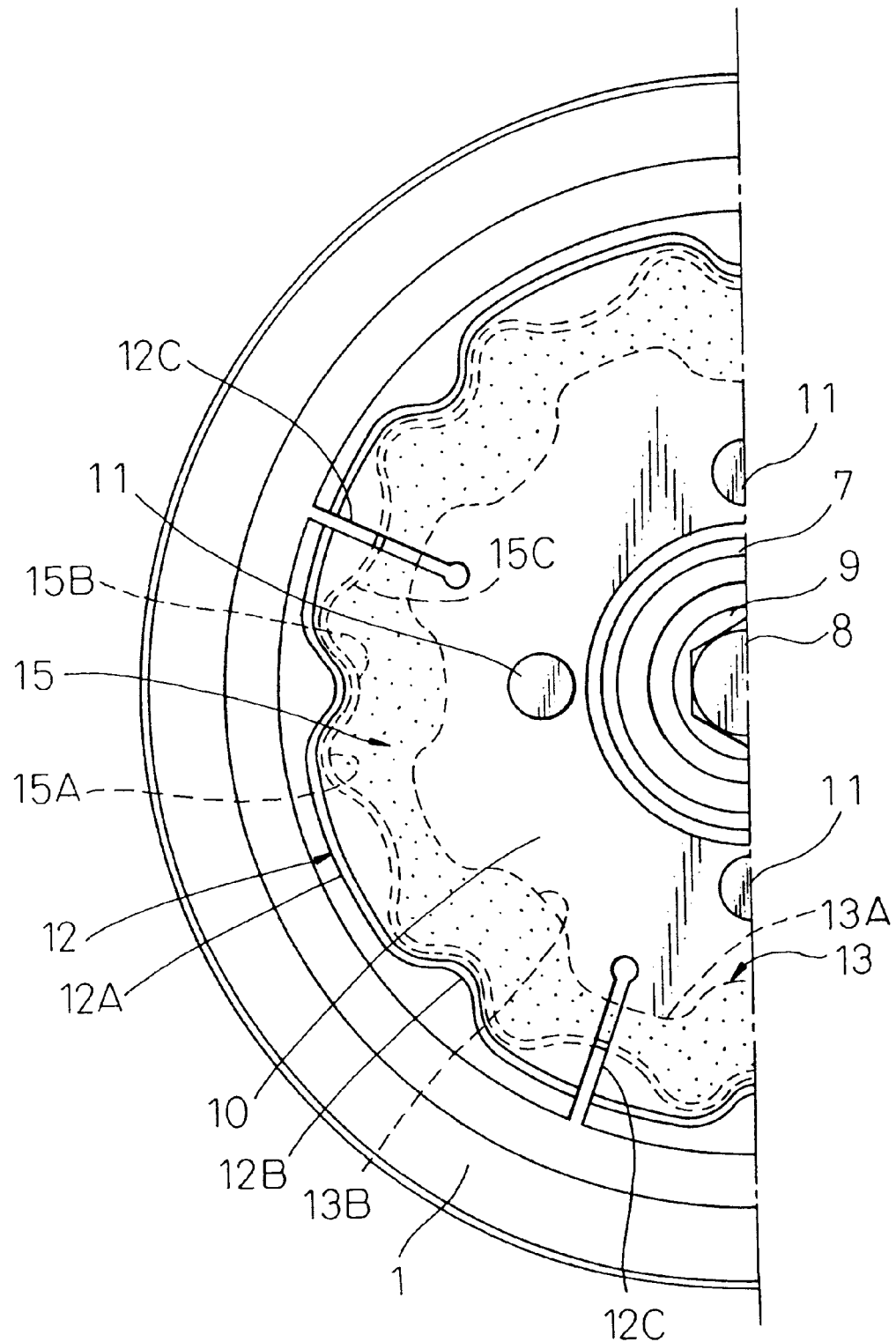
FIG. 15 is a partial front view of the device according to the third embodiment in which a single connection member in the form of a ring is provided.
Figure 16:
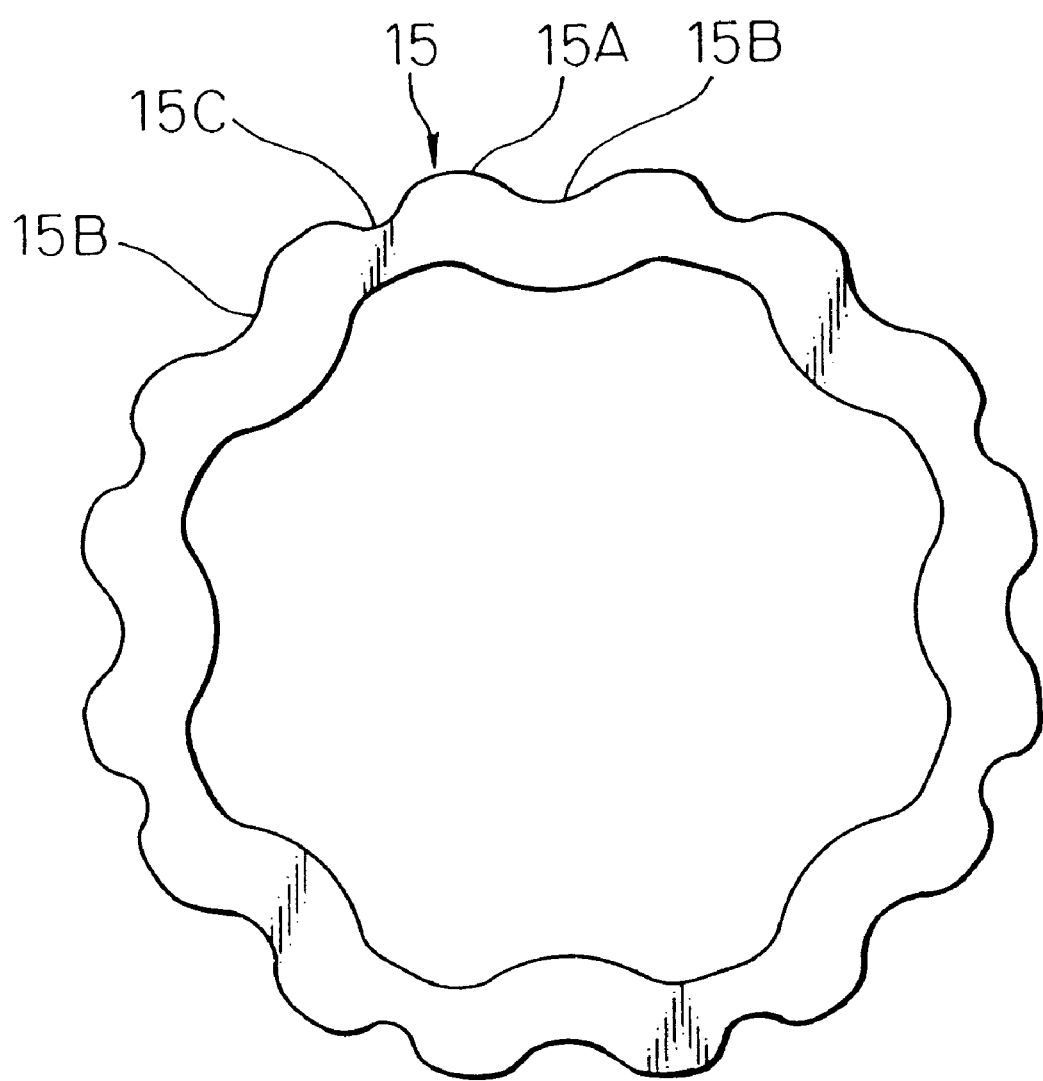
FIG. 16 is a front view of the connecting member according to the third embodiment.

With reference to FIGS. 15 and 16, the third embodiment includes a single resilient elastic connecting member 15 in the form of a ring while the first and second embodiments include four elastic connecting members 15.

The elastic connecting member 15 is substantially formed into a ring, which includes a plurality of outwardly convex and concave portions 15A and 15B alternatively arranged along its periphery. During assembly, the elastic connecting member 15 is clamped between the clamping portions 13C of the holder member 13 and the second hub 10 so that the outwardly convex and concave portions of the elastic connecting member 15 are mated to those of the wall 12 of the second hub 10 and of the holder member 13.

The thickness of the elastic connecting member 15 is slightly larger than the distance between the second hub 10 and the clamping portions 13C of the holder member 13. Thus, the elastic connecting member 15 is pressed therebetween, when assembled, to ensure the engagement with the second hub 10 and the holder member 13 through the convex and concave portions. The positive engagement operatively connects the holder member 13 to the second hub 10 as mentioned above.

The elastic connecting member 15 further includes a plurality of outwardly concave recesses 15C, on the outwardly convex portions 15A, for aiding the deformation of the elastic connecting member 15. The cylindrical wall 12 and the recesses 15C define relieving clearances 12E, which facilitate the deformation of the elastic connecting member 15. The clearances 12E also function to relieve the deformation of the elastic connecting member 15 during assembling by permitting a portion of the elastic connecting member 15 to enter the clearances so that the dimensional tolerance of the parts is compensated for to ensure the predetermined cutoff torque.

Selecting the size and configuration allows a designer to set a cutoff torque level at which the elastic connecting member 15 deforms to disconnect the rotational power transmission from the holder member 13 to the second hub 10.

The hub and wall 10 and 12 may be provided with slits similar to slits 12C in the first and second embodiment. Further, foot portions similar to those mentioned above may be provided in the elastic connecting member and the wall to adjust the torsional spring coefficient of the device.

Figure 17:
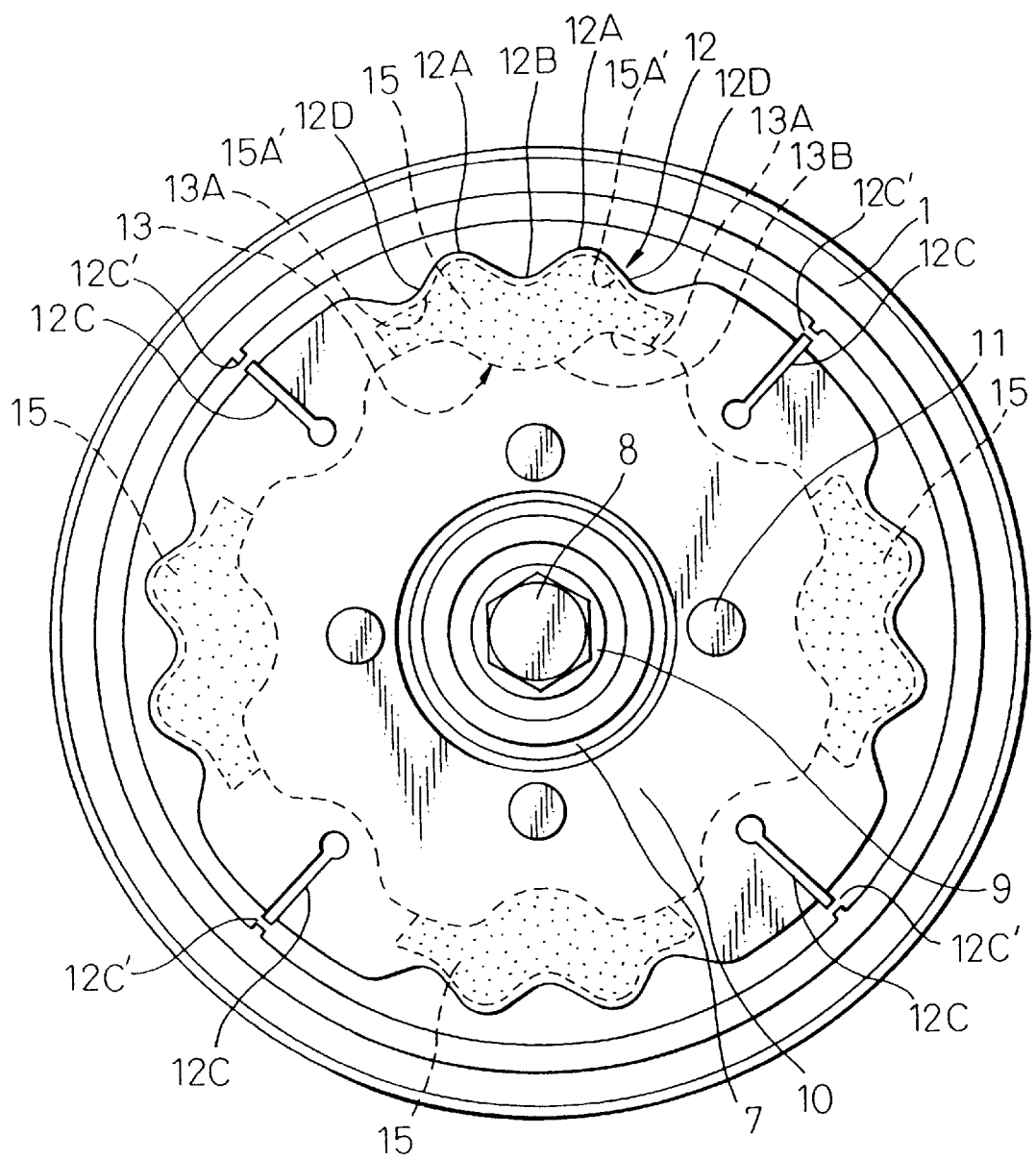
FIG. 17 is a front view, similar to FIG. 2, of the device according to the fourth embodiment.

With reference to FIG. 17, the fourth embodiment of the invention will be described.

According to the fourth embodiment, bridged portions 12C', for increasing the stiffness of the second hub and wall 10 and 12, are provided between the hub 10 and the wall 12 so as to cross the slits 12. In the first embodiment, the slits 12 extend from the radially middle portions of the second hub 10 through the wall 12, which may overly reduce the stiffness of the hub and wall 10 and 12 for several applications, in particular, the compressor 4 is a type of high speed compressor. The higher the rotational speed of the compressor 4, the higher the centrifugal force applied on the hub and wall 10 and 12, which results in the plastic or permanent deformation of the hub and wall 10 and 12 when the stiffness thereof is insufficient.

The bridged portions 12C' provide a reinforcement to the hub and wall 10 and 12 so that the hub and wall 10 and 12 can bear the centrifugal force without plastic or permanent deformation at a high rotational speed. For the cold cured elastic connecting members 15, the bridged portions 12C' will break to aid the deformation of the hub and wall 10 and 12 when the torque about the drive shaft 6 exceeds the cutoff torque level.

Figure 18:
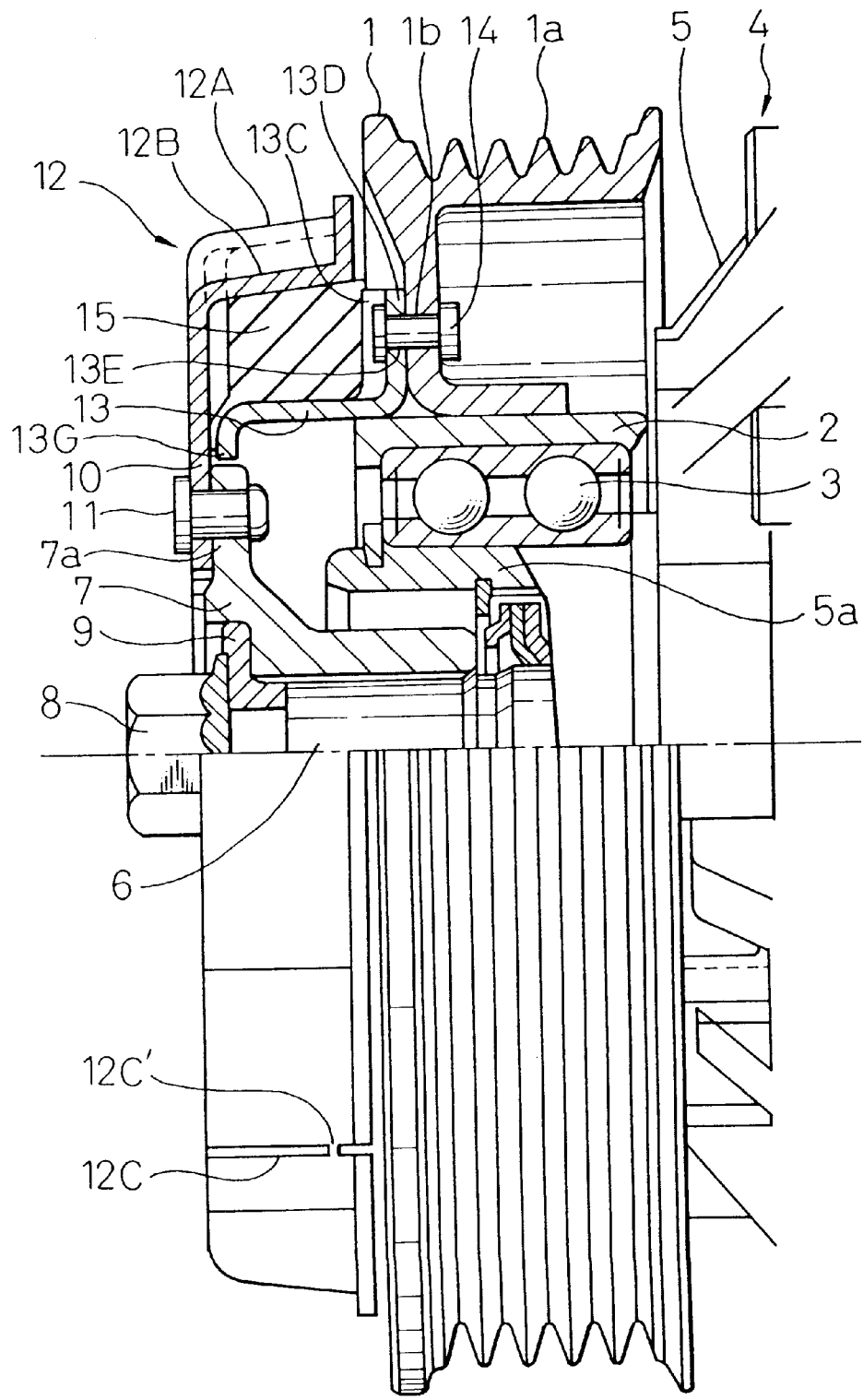
FIG. 18 is a partial section, similar to FIG. 1, of the device according to the fifth embodiment.

With reference to FIG. 18, the fifth embodiment of the invention will be described. According to the fifth embodiment, bridge portions 12C', which correspond to those in the fourth embodiment, are provided in the wall 12 so as to cross the slits 12.

Bridge portions may be provided in the second hub 10 to cross the slits 12.

Further, in order to reduce the centrifugal force on the hub and wall 10 and 12, according to the six embodiment of the invention, the hub and wall 10 and 12 are made of a material which has a density smaller than the steel material, for example, a aluminum material or a resin material. The smaller the density of the material for the hub and the wall, the smaller the centrifugal force which acts on them to reduce the deformation thereof.

Figure 19:
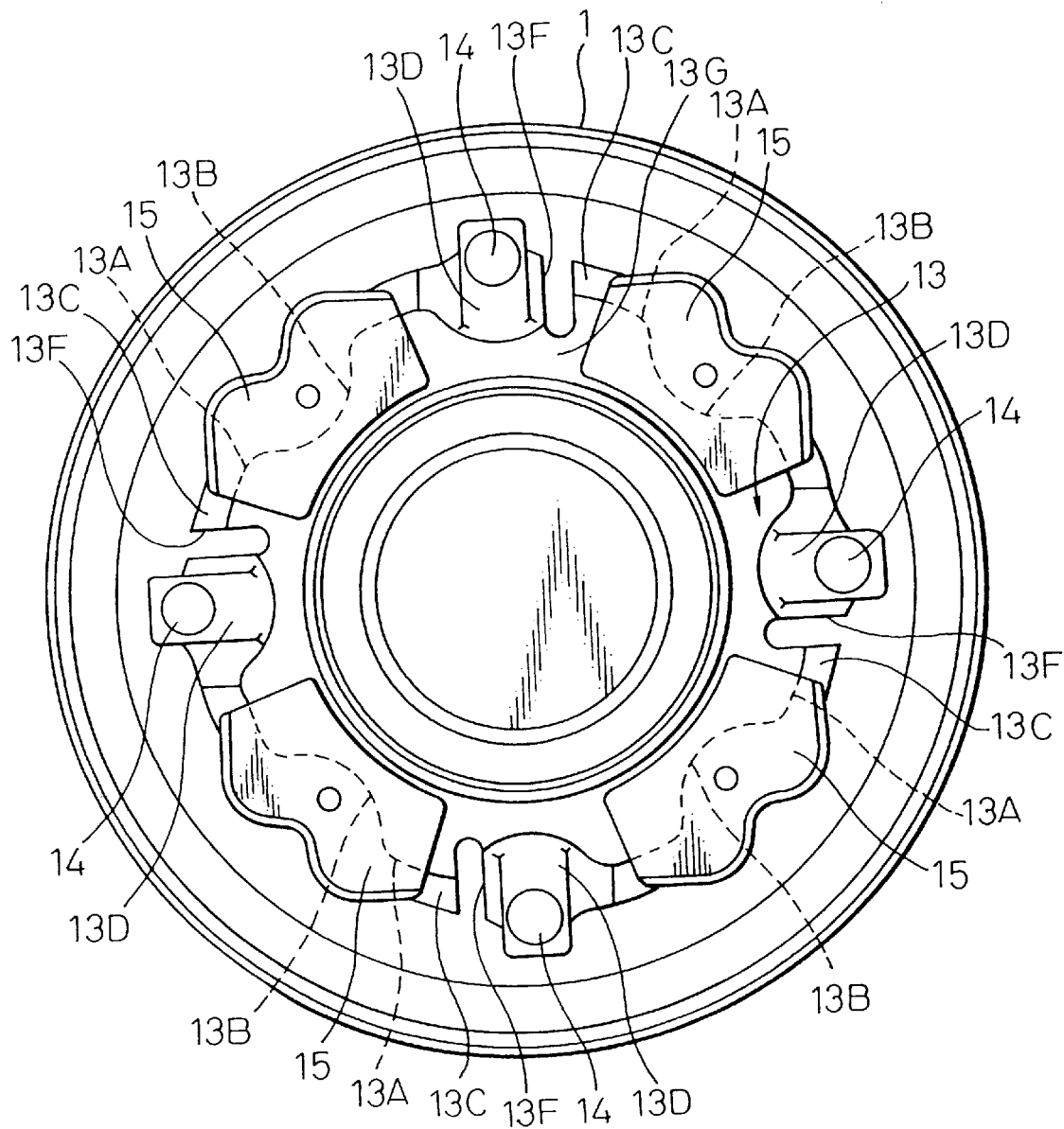
FIG. 19 is a front view, similar to FIG. 3, of the holder member and the connecting members according to the seventh embodiment.

According to FIG. 19, the six embodiment of the invention will be described. FIG. 19 is a front view of the device according to the seventh embodiment in which the first and second hubs 7 and 10 and the wall 12 are removed. The holder member 13 includes four slits 13F in the radially outwardly convex portions 13A. The slits 13F extend from the end wall 13G to the radial portions of the clamping portions 13C through the axial portions of the clamping portions. The four slits 13F divide the holder member 13 into four sectors which are connected by the end wall 13G.

According to the seventh embodiment, for the cold cured elastic connecting members 15, the slits 13G allows the holder member 13 to deform in the radial direction when the torque about the drive shaft 6 exceeds the cutoff torque level. Thus, the elastic connecting members 15 disengage from the wall 12 to cutoff the rotational power transmission.

The centrifugal force on the holder member 13 forces it to the inner faces of the elastic connecting member 15. Therefore, the wall 12 supports the holder member 13 through the elastic connecting members 15 so that the plastic deformation of the holder member 13 is inhibited.

Figure 20:
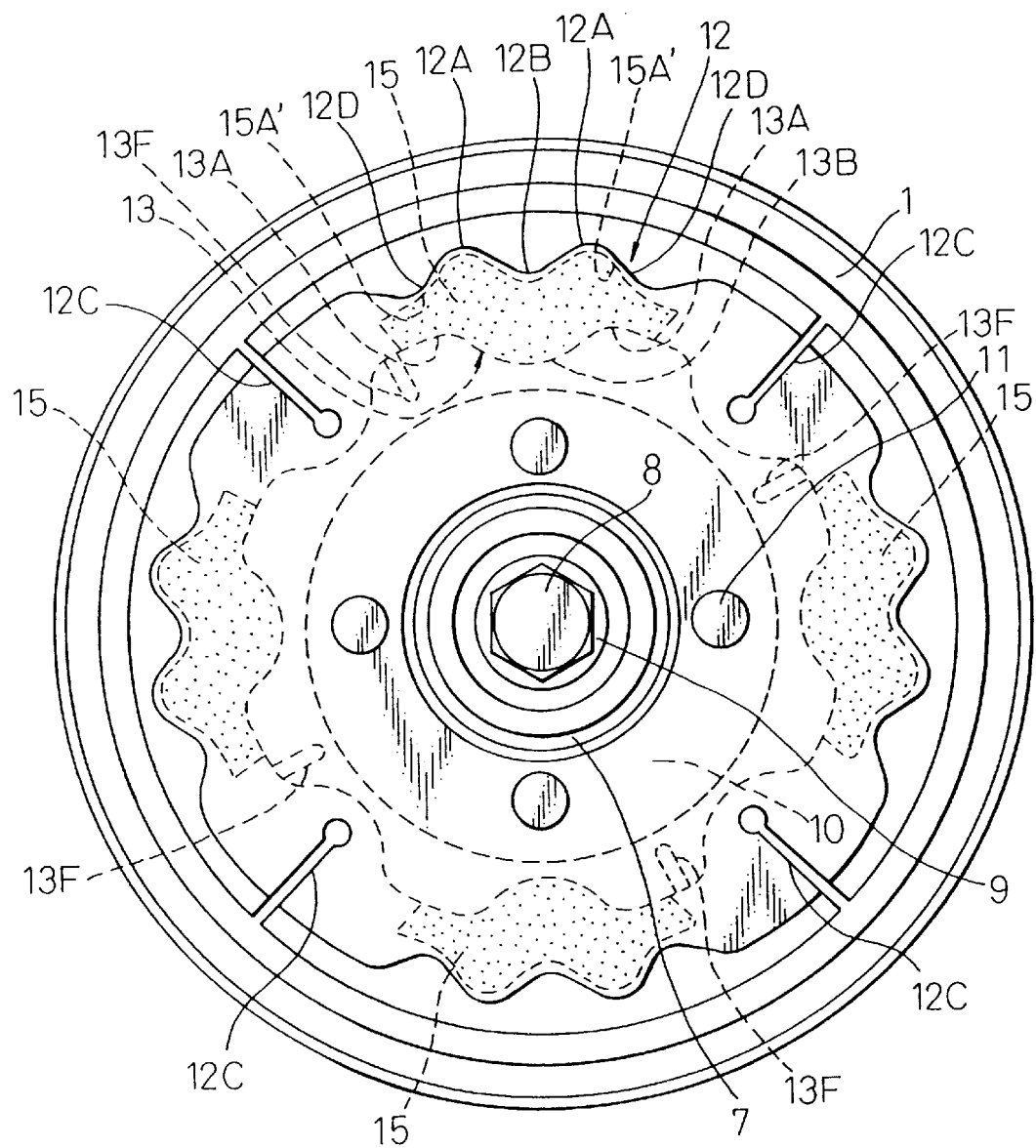
FIG. 20 is a front view, similar to FIG. 2, of the device according to the eighth embodiment.

With reference to FIG. 20, the eighth embodiment of the invention will be described. According to the eighth embodiment, slits 12C are provided in the second hub and wall 10 and 12, and slits 13F are provided in the holder member 13. For a relatively low rotational speed (for example, up to 6000 rmp) of the compressor 4, the centrifugal force on the hub and wall 10 and 12 are so small that the hub and wall 10 and 12 do not deform plastically if the slits 12C are provided. Thus, in this case, the hub and wall 10 and 12 do not deform plastically even if the slits 12C are provided.

Further, making the hub and wall 10 and 12 of a material having a high yield stress point prevents the plastic deformation due to the centrifugal force at a high rotational speed, for example 12000 rmp without the bridge portions 12C'. Thus, according to the eighth embodiment, the slits 12C and 13F are provided in the hub and wall 10 and 12 and the holder member 13 so that the cold cured elastic connecting members 15 can disengage through the plastic deformation of the hub and wall 10 and 12 and the holder member 13.

The elastic connecting member(s) 15 can disengage from the holder member 13 to disconnect the rotational power transmission by deformation of the radially inner side thereof when an exceeding torque is applied on the holder member(s) 15 for example when the compressor 4 is locked although, in the above-described embodiment, the elastic connecting member(s) 15 deforms at the radially outer periphery thereof to disengage from the wall 12. In this case, the device includes a configuration similar to that of foot portions of the elastic connecting members and the radially recessed portions of the wall. Further, the elastic connecting members 15 may be adhered, at the outer periphery thereof, to the radially inner face of the wall 12.

Furthermore, although the slits 12C are made to open at one end thereof in the first embodiment, the slits 12C may by formed into closed slits. Likewise, the slits 13F in the holder member 13 can be formed into closed slits. Altogether, the slits 12C and 13F may be formed into any shape which can provide weakened portions aiding the deformation of the hub and wall 10 and 12 and the holder member 13.

Furthermore, the elastic connecting members 15 include flat surface without the convex and concave portions to which the holder member 13 or the wall 12 is adhered.

Furthermore, the device of the invention can include a holder member which is connected to the pulley 1 and engages the radially outer surface of the elastic connecting member(s) 15 and a hub and wall 12 which is connected to the drive shaft 6 and engage the radially inner surface of the elastic connecting member(s) 15 although the holder member 13 and the wall 12 engage the inner and outer surfaces of the elastic connecting member(s) 15, respectively, in the above-described embodiment.

It will also be understood by those skilled in the art that the forgoing description is of preferred embodiments of the disclosed device and that various changes and modifications may be made without departing from the spirit and scope of the invention.

We claim:

1. A device for transmitting rotational power from a rotational power source to a driven device having a drive shaft, the device for transmitting rotational power comprising:

at least one elastic connecting member defining outer and inner peripheral surfaces;

a first holder member, for holding the at least one elastic connecting member at the radially outer or inner periphery of the at least one elastic connecting member, the first holder member being connected to the drive shaft;

a second holder member for holding the at least one elastic connecting member at the radially inner or outer periphery of the at least one elastic connecting member, the second holder member being operatively connected to the rotational power source;

the first and second holder members radially cooperating with each other to circumferentially hold the at least one elastic connecting member during normal operation to transmit the rotation, and being disconnected by the deformation of the at least one elastic connecting member when the torque of the drive shaft exceeds a predetermined cutoff torque level; and a weakened portion, which includes radial slits provided on at least one of the first and second holder members, for aiding the deformation of at least one of the first and second holder members to reduce a torsional spring coefficient which is defined by the ratio of the relative rotational angle between the first and second holder member to the torque of the drive shaft.

2. A device for transmitting rotational power according to claim 1 in which the weakened portion is provided in one of the first and second holder members engaging the radially outer periphery of the at least one of the elastic connecting members.

3. A device for transmitting rotational power according to claim 2 in which one of the first and second holder members, which engages the radially outer periphery of the at least one of the elastic connecting members, is made of a material having a density less than that of a steel material.

4. A device for transmitting rotational power according to claim 3 in which the weakened portion is provided in one of the first and second holder members which engages the radially inner periphery of the elastic connecting member.

5. A device for transmitting rotational power according to claim 1 in which the weakened portion is provided in both the first and second holder members.

6. A device for transmitting rotational power according to claim 1 in which the elastic connecting member comprises a plurality of elastic connecting members adhered to one of the first and second holder members;

the elastic connecting members being disengaged from the second or first holder member by the deformation thereof when the torque exceeds a predetermined cutoff torque level; and the slit being disposed in the first or second holder member between the elastic connecting members.

7. A device for transmitting rotational power according to claim 1 in which the slit is provided one of the holder members which engages the outer periphery of the elastic connecting member, the slit including a bridge portion extending between the edges thereof.

8. A device for transmitting rotational power according to claim 7 in which the elastic connecting member comprises a plurality of elastic connecting members adhered to one of the first and second holder members;

the elastic connecting members being disengaged from the second or first holder member by the deformation thereof when the torque exceeds a predetermined cutoff torque level; and the slit being disposed in the first or second holder member between the elastic connecting members.

9. A device for transmitting rotational power according to claim 1 in which the elastic connecting member comprises a elastic connecting member in the form of a ring adhered to one of the first and second holder members; and the elastic connecting member being disengaged from the second or first holder member by the deformation thereof when the torque exceeds a predetermined cutoff torque level.

10. A device for transmitting rotational power according to claim 1 in which the elastic connecting member includes at least a pair of radially outwardly convex portions and a radially outwardly concave portion provided between the pair of the convex portions;

the pair of the convex portions defining at least a front, relative to the rotational direction, foot portion opposite to the concave portion;

at least one of the first and second holder members including at least a radially outwardly concave portion engaging the concave portion of the elastic connecting member, and at least a front, relative to the rotational direction, foot portion engaging the front foot portion of the elastic connecting member; and the engagement between the concave portions of the elastic connecting member and one of the first and second holder members providing a first torsional spring coefficient, and the engagement between the foot portions of the elastic connecting member and one of the first and second holder members providing a second torsional spring coefficient, the combination of the torsional spring coefficients providing a relatively high overall torsional spring coefficient at a relatively low rotational speed of the drive shaft and a relatively low torsional spring coefficient at a relatively high rotational speed of the drive shaft.

11. A device for transmitting rotational power from a rotational power source to a driven device having a drive shaft, the device for transmitting rotational power comprising:

at least one elastic connecting member defining outer and inner peripheral surfaces;

a first holder member, for holding the at least one elastic connecting member at the radially outer or inner periphery of the at least one elastic connecting member, the first holder member being connected to the drive shaft;

a second holder member for holding the at least one elastic connecting member at the radially inner or outer periphery of the at least one elastic connecting member, the second holder member being operatively connected to the rotational power source;

the first and second holder members radially cooperating with each other to circumferentially hold the at least one elastic connecting member during normal operation to transmit the rotation, and being disconnected by the deformation of the at least one elastic connecting member when the torque on the drive shaft exceeds a predetermined cutoff torque level;

a weakened portion, which includes radial slits provided on at least one of the first and second holder members, for aiding the deformation of at least one of the first and second holder members, the elastic connecting member including at least a pair of radially outwardly convex portions and a radially outward concave portion provided between the pair of the convex portions;

the pair of the convex portions defining at least a front, relative to the rotational direction, foot portion opposite to the concave portion;

at least one of the first and second holder members including at least a radially outwardly concave portion engaging the concave portion of the elastic connecting member, and at least a front, relative to the rotational direction, foot portion engaging the front foot portion of the elastic connecting member; and the engagement between the concave portions of the elastic connecting member and one of the first and second holder members providing a first torsional spring coefficient, and the engagement between the foot portions of the elastic connecting member and one of the first and second holder members providing a second torsional spring coefficient, the combination of the torsional spring coefficients providing a relatively high overall spring coefficient at a low rotational speed of the drive shaft and a relatively low torsional spring coefficient at a relatively high rotational speed of the drive shaft.

12. A device for transmitting rotational power according to claim 11 in which the elastic connecting member has a radial width at the radially outwardly convex portions larger than that at the foot portion.

13. A device for transmitting rotational power according to claim 12 in which the elastic connecting member comprises a plurality of elastic connecting members adhered to one of the first and second holder members; and the elastic connecting members being disengaged from the second or first holder member by the deformation thereof when the torque exceeds a predetermined cutoff torque level.

14. A device for transmitting rotational power according to claim 11 in which the elastic connecting member comprises a elastic connecting member in the form of a ring adhered to one of the first and second holder members; and the elastic connecting member being disengaged from the second or first holder member by the deformation thereof when the torque exceeds a predetermined cutoff torque level.

15. A device for transmitting rotational power from a rotational power source to a driven device having a drive shaft, the device for transmitting rotational power comprising:

at least one elastic connecting member defining outer and inner peripheral surfaces;

a first holder member, for holding the at least one elastic connecting member at the radially outer or inner periphery of the at least one elastic connecting member, the first holder member being connected to the drive shaft;

a second holder member for holding the at least one elastic connecting member at the radially inner or outer periphery of the at least one elastic connecting member, the second holder member being operatively connected to the rotational power source;

the first and second holder members radially cooperating with each other to circumferentially hold the at least one elastic connecting member during normal operation to transmit the rotation, and being disconnected by the deformation of the at least one elastic connecting member when the torque of the drive shaft exceeds a predetermined cutoff torque level;

a weakened portion, which includes radial slits provided on at least one of the first and second holder members, for aiding the deformation of at least one of the first and second holder members to reduce a torsional spring coefficient which is defined by the ratio of the relative rotational angle between the first and second holder member to the torque of the drive shaft;

the elastic connecting member including at least a pair of radially outwardly convex portions and a radially outwardly concave portion provided between the pair of convex portions;

the pair of the convex portions defining at least a front, relative to the rotational direction, foot portion opposite to the concave portion;

at least one of the first and second holder members including at least a radially outwardly concave portion engaging the concave portion of the elastic connecting member, and at least a front, relative to the rotational direction, foot portion engaging the front foot portion of the elastic connecting member; and the engagement between the concave portions of the elastic connecting member and one of the first and second holder members providing a first torsional spring coefficient, and the engagement between the foot portions of the elastic connecting member and one of the first and second holder members providing a second torsional spring coefficient, the combination of the torsional spring coefficients providing a relatively high overall torsional spring coefficient at a relatively low rotational speed of the drive shaft and a relatively low torsional spring coefficient at a relatively high rotational speed of the drive shaft.

* * * * *